(12) United States Patent
Kobayashi

(10) Patent No.: US 7,269,184 B2
(45) Date of Patent: Sep. 11, 2007

(54) DATA TRANSMISSION METHOD AND APPARATUS AND DATA RECEIVING METHOD AND APPARATUS

(75) Inventor: Toshiharu Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1301 days.

(21) Appl. No.: 10/219,703

(22) Filed: Aug. 15, 2002

(65) Prior Publication Data

US 2003/0043850 A1    Mar. 6, 2003

(30) Foreign Application Priority Data

Aug. 17, 2001  (JP) .............................. 2001-247643

(51) Int. Cl.
*H04J 3/16* (2006.01)
(52) U.S. Cl. ...................................... 370/468; 370/465
(58) Field of Classification Search ...................... None
See application file for complete search history.

(56) References Cited

U.S. PATENT DOCUMENTS 5,790,538 A * 8/1998 Sugar .......................... 370/352
5,982,780 A * 11/1999 Bohm et al. .................. 370/450
6,243,391 B1 * 6/2001 Holmquist .................... 370/458
6,529,520 B1 * 3/2003 Lee et al. ..................... 370/442
6,731,628 B1 * 5/2004 Shiomoto et al. ............ 370/355
6,934,752 B1 * 8/2005 Gubbi .......................... 709/225

\* cited by examiner

*Primary Examiner*—Phirin Sam
(74) *Attorney, Agent, or Firm*—Finnegan, Henderson, Farabow, Garrett & Dunner, L.L.P.

(57) ABSTRACT

When transmitting live information data, a reproduction start waiting time associated with reproduction of the live information data on the receiving side can be reduced. Encoded data is divided in sequence into a plurality of data segments each having a predetermined time length. In this case, the time length of each data segment is increased in sequence for each data segment until a predetermined time length is reached and is fixed to the predetermined time length after the predetermined time length is reached. The plurality of data segments which are formed in a divided manner are converted into a plurality of segmented packet data or a plurality of continuous packet data, and the data is transmitted through individual data transmission channels, thus performing multiple-channel parallel transmission.

30 Claims, 17 Drawing Sheets

DATA TRANSMISSION METHOD AND APPARATUS AND DATA RECEIVING METHOD AND APPARATUS

BACKGROUND OF THE INVENTION

1. Field of the Invention

The present invention relates to a data transmission method and apparatus therefor, for dividing information data, such as on-demand broadcast signal data, into a plurality of data segments and for transmitting each of the data segments formed in a divided manner through individual data transmission channels, and to a data receiving method and apparatus therefor, for receiving data transmitted by such a data transmission method or apparatus therefor.

2. Description of the Related Art

A method has been proposed in which, in television broadcasts in which movies or recorded images/audio are content, content desired on the receiving side at a desired time can be received. A broadcast in such a method is called a "broadcast of an on-demand method (on-demand broadcast)". With remarkable developments in digital technology in both areas of hardware and software and heavy diversification of content which is broadcast, the present situation is that such on-demand broadcasts are expected to become widely used.

In data transmission using the on-demand form such as on-demand broadcasts, information data representing content to be broadcast is made to be, for example, encoded data on which a predetermined coding process is performed. When performing data processing for the transmission of the encoded data, for data division, generally, two techniques are used, and for data transmission, generally, two techniques are used.

One of the two techniques regarding data division is an equal-length division technique for dividing encoded data representing various types of content into a plurality of data segments having an equal time length. The other technique is an unequal-length division technique for dividing encoded data representing various types of content into a plurality of data segments having a gradually increasing time length. Furthermore, one of the two techniques regarding data transmission is a repeated transmission technique for converting each of a plurality of data segments, formed as a result of encoded data representing various types of content being divided, into segmented packet data in order to form a plurality of segmented packet data and for repeatedly transmitting each of the segmented packet data. The other technique is a continuous transmission technique for obtaining continuous packet data by performing specific coding on each of a plurality of data segments, formed as a result of encoded data representing various types of content being divided, in order to form a plurality of continuous packet data and for continuously transmitting each of the continuous packet data.

FIG. 12 is a timing chart which conceptually shows an example of data transmission of an on-demand form in which an equal-length division technique and a repeated transmission technique are used. In this example, encoded data representing predetermined content to be transmitted is divided into p data segments DS1 to DSp having an equal time length.

The data segment DS1 which is formed in a divided manner is converted into segmented packet data DP1. The segmented packet data DP1 is formed as packet stream data on which a predetermined coding process is performed. Then, the segmented packet data DP1 is repeatedly transmitted through a data transmission channel CH1.

In a similar manner, the data segments DS2 to DSp which are formed in a divided manner are converted into segmented packet data DP2 to DPp which is packet stream data, respectively, on which a predetermined coding process is performed. Then, the segmented packet data DP2 to DPp is repeatedly transmitted through data transmission channels CH2 to CHp, respectively.

In this manner, the segmented packet data DP1 to DPp which is repeatedly transmitted through individual data transmission channels (each of the data transmission channels CH1 to CHp) forms transmission data of p channels. On the receiving side, at any desired time, the segmented packet data DP1 to DPp sent as transmission data of p channels are received in sequence, the data segments DS1 to DSp which are based on the received segmented packet data DP1 to DPp, respectively, are obtained, these data segments are sent in sequence, and the encoded data representing the original content is reproduced.

FIG. 13 is a timing chart which conceptually shows an example of data transmission of an on-demand form in which an equal-length division technique and a continuous transmission technique are used. Also in this example, encoded data representing predetermined content to be transmitted is divided into p data segments DS1 to DSp having an equal time length.

As a result of a specific coding process being performed on the data segment DS1 which is formed in a divided manner, the data segment DS1 is converted into continuous packet data DLT1 which is composed of a continuous packet stream. For a specific coding process in such a case, a special coding process (hereinafter referred to as an "LT coding process") is used in which, for example, a packet stream with nearly infinite continuousness is formed so as to be capable of reproducing the original data segment DS1 from, for example, one of the portions having the amount of data corresponding to approximately 105% of the data segment DS1 (portion of a predetermined amount of data) within that packet stream. Then, the continuous packet data DLT1 is continuously transmitted through the data transmission channel CH1.

In a similar manner, as a result of, for example, a specific coding process, which is an LT coding process, being performed on each of the data segments DS2 to DSp which are formed in a divided manner, the data segments DS2 to DSp are converted into continuous packet data DLT2 to DLTp, each of which is composed of a continuous packet stream. Then, the continuous packet data DLT2 to DLTp is continuously transmitted through data transmission channels CH2 to CHp, respectively.

In this manner, the continuous packet data DLT1 to DLTp which is transmitted through individual data transmission channels (each of the data transmission channels CH1 to CHp) forms transmission data of p channels. On the receiving side, at any desired time, a portion of a predetermined amount of data in each of the continuous packet data DLT1 to DLTp, sent as transmission data of p channels, is received in sequence, the data segments DS1 to DSp based on the portion of a predetermined amount of data in each of the received continuous packet data DLT1 to DLTp, respectively, are obtained, these data segments are sent in sequence, and the encoded data representing the original content is reproduced.

FIG. 14 is a timing chart which conceptually shows an example of data transmission of an on-demand form in which an unequal-length division technique and a repeated transmission technique are used. In this example, encoded data representing predetermined content to be transmitted is divided into q data segments DS1 to DSq having a gradually increasing time length.

The data segment DS1 which is formed in a divided manner so as to have the shortest time length is converted into segmented packet data DP1. The segmented packet data DP1 is formed as packet stream data on which a predetermined coding process is performed. Then, the segmented packet data DP1 is repeatedly transmitted through the data transmission channel CH1.

The data segments DS2 to DSq which are formed in a divided manner so as to be longer than the time length of the data segment DS1 and so as to have gradually increasing time lengths are also converted into segmented packet data DP2 to DPq, which is formed as packet stream data on which a predetermined coding process is performed, respectively. Then, the segmented packet data DP2 to DPq is repeatedly transmitted through data transmission channels CH2 to CHq, respectively.

In this manner, the segmented packet data DP1 to DPq which is repeatedly transmitted through individual data transmission channels (each of the data transmission channels CH1 to CHp) forms transmission data of q channels. On the receiving side, at any desired time, the segmented packet data DP1 to DPq sent as transmission data of q channels is received in sequence, the data segments DS1 to DSq which are based on the received segmented packet data DP1 to DPq, respectively, are obtained, these data segments are sent in sequence, and the encoded data representing the original content is reproduced.

FIG. 15 is a timing chart which conceptually shows an example of data transmission of an on-demand form in which an unequal-length division technique and a continuous transmission technique are used. Also in this example, encoded data representing predetermined content to be transmitted is divided into q data segments DS1 to DSq having a gradually increasing time length.

The data segment DS1 which is formed in a divided manner so as to have the shortest time length is converted into continuous packet data DLT1 composed of a continuous packet stream, for example, as a result of a specific coding process which is an LT coding process being performed thereon. Then, the continuous packet data DLT1 is continuously transmitted through the data transmission channel CH1.

In a similar manner, the data segments DS2 to DSq which are formed in a divided manner so as to be longer than the time length of the data segment DS1 and so as to have a gradually increasing time length are also converted into continuous packet data DLT2 to DLTq, each of which is composed of a continuous packet stream, as a result of a specific coding process which is an LT coding process being performed on each of the data segments. Then, the continuous packet data DLT2 to DLTQ is continuously transmitted through the data transmission channels CH2 to CHq, respectively.

In this manner, the continuous packet data DLT1 to DLTq which is transmitted through individual data transmission channels (each of the data transmission channels CH1 to CHq) forms transmission data of q channels. On the receiving side, at any desired time, the portion of a predetermined amount of data in each of the continuous packet data DLT1 to DLTQ sent as transmission data of q channels is received in sequence, the data segments DS1 to DSq which are based on the portion of the predetermined amount of data in each of the received continuous packet data DLT1 to DLTq, respectively, are obtained, these data segments are sent in sequence, and the encoded data representing the original content is reproduced.

In either case of the data transmission of the on-demand form using an equal-length division technique, such as an example of which is shown in FIGS. 12 and 13 and the data transmission of the on-demand form using an unequal-length division technique, such as an example of which is shown in FIGS. 14 and 15, on the receiving side, reproduction of the data segment DS1 is performed after the reception of the portion of the predetermined amount of data in the segmented packet data DP1 or the continuous packet data DLT1 is completed. In a similar manner, the reproduction of each of the data segments DS2 to DSp or the data segments DS2 to DSq is also performed after the reception of the portion of the predetermined amount of data in the continuous packet data DLT2 to DLTp or in the continuous packet data DLT2 to DLTq is completed. Therefore, on the receiving side, when the reception of the predetermined amount of data in the segmented packet data DP1 or the continuous packet data DLT1 is completed, the reproduction of the data segments DS1 to DSp or the data segments DS1 to DSq is started, and in order to make the reproduction start waiting time for the data segments DS1 to DSp or the data segments DS1 to DSq short, the time length of the data segment DS1 is made relatively short.

Therefore, in the case of the data transmission of the on-demand form using the equal-length division technique, each of the data segments DS1 to DSp is made to have a relatively short time length. As a result, the number of data divisions for the encoded data representing the content to be transmitted becomes relatively large, and the number of data transmission channels becomes relatively large.

In contrast, in the case of the data transmission of the on-demand form using the unequal-length division technique, the time length of the data segment DS1 is made to be relatively short, but the time length of each of the data segments DS2 to DSq is gradually increased. As a result, the number of data divisions for the encoded data representing content to be transmitted is less than that in the case of the data transmission of the on-demand form using the equal-length division technique, and a lesser number of data transmission channels is required. Therefore, from the viewpoint of reducing the number of data transmission channels, data transmission of the on-demand form using the unequal-length division technique is desirable.

In such a situation, in the data transmission of the on-demand form, when content to be transmitted is so-called live information, such as live performance information, live program information, live broadcast information, etc., on the receiving side, after the start time of the live information (the start time of a live performance, a live program, a live broadcast, etc.), a reproduction start waiting time up to the time encoded data representing content which is that live information (live content) can be reproduced from the beginning occurs.

FIG. 16 is a timing chart showing an example of data transmission of an on-demand form in which content to be transmitted is live information. In this example, an unequal-length division technique is used to reduce the number of data transmission channels, and a repeated transmission technique is used.

In the case of such an example shown in FIG. 16, encoded data representing live content is divided into r data segments DS1 to DSr having a gradually increasing time length. At a live information start time t1, encoded data representing live content begins to be formed, and repeated transmission of the segmented packet data DP1 based on the data segment DS1, through the data transmission channel CH1, is started. Thereafter, repeated transmission of the segmented packet data DP2 to DPr based on the data segments DS2 to DSr, through the data transmission channels CH2 to CHr, respectively, is started in sequence.

On the receiving side, at time t4 when the reception of data which arrives first within the segmented packet data DPr which is repeatedly transmitted through the data transmission channel CHr, is completed, the reproduction of the data segment DSr based on the received segmented packet data DPr can be started. Therefore, time t2 obtained by calculating backwards, from time t4, the corresponding time lengths of the data segments DSr−1 to DS1 reproduced before time t4, is assumed to be a time when the reproduction of the data segment DS1 based on the segmented packet data DP1 is started, and after the reproduction of the data segment DS1, the reproduction of the data segments DS2 to DSr based on the segmented packet data DP2 to DPr is performed in sequence. That is, from time t2, the data segments DS1 to DSr can be reproduced continuously from the beginning.

In such a situation, a reproduction start waiting time Tv from the live information start time t1 to the time t2 occurs. For a person who reproduces the data segments DS1 to DSr on the reproduction side, it is preferable that such a reproduction start waiting time Tv be as short as possible.

The time t4, which is a reference for determining the reproduction start waiting time Tv, is a time when the encoded data representing live content ends. Therefore, the reproduction start waiting time Tv from time t1 to time t2 is made to be equal to the time length of the data segment DSr, which begins to be reproduced at time t4. The data segment DSr is a segment with the maximum time length among the data segments DS1 to DSr. Therefore, the reproduction start waiting time Tv from time t1 to time t2 becomes a relatively long time, and the condition such that the reproduction start waiting time is preferably as short as possible for a person who reproduces the data segments DS1 to DSr cannot be satisfied.

FIG. 17 is a timing chart showing another example of data transmission of an on-demand form in which content to be transmitted is live information. In this example, an unequal-length division technique is used to reduce the number of data transmission channels, and a continuous transmission technique is used.

Also in the case of such an example as shown in FIG. 17, encoded data representing live content is divided into r data segments DS1 to DSr having a gradually increasing time length. At a live information start time t5, encoded data representing live content begins to be formed, and when the formation of the data segment DS1 is completed after the live information start time t5, the transmission of the continuous packet data DLT1 based on the data segment DS1, through the data transmission channel CH1, is started. Thereafter, when the formation of each of the data segments DS2 to DSr is completed, transmission of the continuous packet data DLT2 to DLTr based on the data segments DS2 to DSr, through the data transmission channels CH2 to CHr, respectively, is started in sequence.

On the receiving side, at a time t8 when the reception of the portion of the predetermined amount of data of the continuous packet data DLTr, which is obtained first, which is transmitted through the data transmission channel CHr, the reproduction of the data segment DSr based on the portion of the predetermined amount of data in the received continuous packet data DLTr can be started. Therefore, a time t6, which is obtained by calculating backwards, from time t8, each of the time lengths of the data segments DSr−1 to DS1 reproduced before time t8, is assumed to be a time when the reproduction of the data segment DS1 based on the portion of the predetermined amount of data in the continuous packet data DLT1 is started, and after the reproduction of the data segment DS1, the reproduction of the data segments DS2 to DSr based on the portion of the predetermined amount of data in each of the continuous packet data DLT2 to DLTr is performed in sequence. That is, from time t6, the data segments DS1 to DSr can be reproduced continuously from the beginning.

In such a situation, a reproduction start waiting time Tw from the live information start time t5 to time t6 occurs. Of course, for a person who reproduces the data segments DS1 to DSr on the reproduction side, such a reproduction start waiting time Tw is a time which is preferably as short as possible.

The time t8 which is a reference for determining the reproduction start waiting time Tw is a time such that a time corresponding to the time length of the portion of the predetermined amount of data of the continuous packet data DLTr, which is obtained first, has passed from the time t7 when the encoded data representing live content ends. Therefore, the reproduction start waiting time Tw from time t5 to time t6 is made to be equal to the sum of the time length of the portion of the predetermined amount of data, which is obtained first, of the continuous packet data DLTr which is begun to be sent at time t7 and the time length of the data segment DSr whose reproduction is started at time t8. The data segment DSr is a segment that has the maximum time length among the data segments DS1 to DSr. Therefore, the reproduction start waiting time Tw from time t5 to time t6 becomes a relatively long time, and the condition such that the reproduction start waiting time be as short as possible for the person who reproduces the data segments DS1 to DSr cannot be satisfied.

SUMMARY OF THE INVENTION

In view of such points, an object of the present invention is to provide a data transmission method and apparatus therefor, which are capable of reducing a reproduction start waiting time associated with the reproduction of information data (live information data) on the receiving side, for example, when content to be transmitted is live content in a case where data transmission of an on-demand form using the unequal-length division technique with regard to information data representing predetermined content to be transmitted, is to be performed, and to provide a data receiving method and apparatus therefor, for receiving data transmitted by such a data transmission method and apparatus therefor.

To achieve the above-mentioned object, in one aspect, the present invention provides a data transmission method comprising the steps of: dividing information data in sequence into a plurality of data segments, each having a predetermined time length, in such a manner that the predetermined time length of each data segment is increased in sequence for each of the data segments until a predetermined time length is reached, and that, after the predetermined time length is reached, the length is fixed to the predetermined time length; converting each of the plurality of data segments which are formed in a divided manner into segmented packet data in order to form a plurality of segmented packet data; and repeatedly transmitting each of the plurality of segmented packet data through individual data transmission channels, thus performing multiple-channel parallel transmission.

In another aspect, the present invention provides a data transmission method comprising the steps of: dividing information data in sequence into a plurality of data segments, each having a predetermined time length, in such a manner that the predetermined time length of each data segment is increased in sequence for each of the data segments until a predetermined time length is reached, and that, after the predetermined time length is reached, the length is fixed to the predetermined time length; obtaining continuous packet data by performing a specific coding process on each of the plurality of data segments which are formed in a divided manner in order to form a plurality of continuous packet data; and repeatedly transmitting each of the plurality of continuous packet data through individual data transmission channels, thus performing multiple-channel parallel transmission.

In another aspect, the present invention provides a data transmission apparatus comprising: information data entering means for entering information data to memory means; data dividing means for dividing the information data entered into the memory means in sequence into a plurality of data segments, each having a predetermined time length, in such a manner that the predetermined time length is increased in sequence for each of the data segments until a predetermined time length is reached, and that, after the predetermined time length is reached, the length is fixed to the predetermined time length; packet data forming means for converting each of the plurality of data segments which are formed in a divided manner by the data dividing means into segmented packet data in order to obtain a plurality of segmented packet data; and data transmission means for repeatedly transmitting each of the plurality of segmented packet data obtained by the packet data forming means through individual data transmission channels, thus performing multiple-channel parallel transmission.

In another aspect, the present invention provides a data transmission apparatus comprising: information data entering means for entering information data to memory means; data dividing means for dividing the information data entered into the memory means in sequence into a plurality of data segments, each having a predetermined time length, in such a manner that the predetermined time length is increased in sequence for each of the data segments until a predetermined time length is reached, and that, after the predetermined time length is reached, the length is fixed to the predetermined time length; packet data forming means for obtaining continuous packet data by performing a specific coding process on each of the plurality of data segments which are formed in a divided manner by the data dividing means in order to form a plurality of continuous packet data; and data transmission means for transmitting each of the plurality of continuous packet data obtained from the packet data forming means through individual data transmission channels, thus performing multiple-channel parallel transmission.

In another aspect, the present invention provides a data receiving method comprising the steps of: receiving a plurality of segmented packet data, which is obtained in such a manner that each of a plurality of data segments having time lengths which are increased in sequence until a predetermined time length is reached and which are fixed to the predetermined time length after the predetermined time length is reached is converted, each of the plurality of segmented packet data being repeatedly transmitted through individual data transmission channels; obtaining a plurality of data segments, each of which has a predetermined time length, on the basis of each of the plurality of the received segmented packet data; and sending the plurality of data segments in sequence in order to reproduce the information data.

In another aspect, the present invention provides a data receiving method comprising the steps of: receiving a plurality of continuous packet data, which is obtained in such a manner that a specific decoding process is performed on each of a plurality of data segments having time lengths which are increased in sequence until a predetermined time length is reached and which are fixed to the predetermined time length after the predetermined time length is reached, each of the continuous packet data being repeatedly transmitted through individual data transmission channels; obtaining a plurality of data segments, each of which has a predetermined time length, by reproducing a data segment on the basis of a portion of a predetermined amount of data in each of the received continuous packet data; and sending the plurality of data segments in sequence in order to reproduce the information data.

In another aspect, the present invention provides a data receiving apparatus comprising: packet data entering means for receiving a plurality of segmented packet data, which is obtained in such a manner that each of a plurality of data segments having time lengths which are increased in sequence until a predetermined time length is reached and which are fixed to the predetermined time length after the predetermined time length is reached is converted, each of the plurality of segmented packet data being repeatedly transmitted through individual data transmission channels, and for entering the segmented packet data to memory means; data segment forming means for obtaining a plurality of data segments, each of which has the predetermined time length, on the basis of the plurality of segmented packet data entered into the memory means; and data reproduction means for sending the plurality of data segments obtained by the data segment forming means in sequence in order to reproduce the information data.

In another aspect, the present invention provides a data receiving apparatus comprising: packet data entering means for receiving a plurality of continuous packet data, which is obtained in such a manner that a specific decoding process is performed on each of a plurality of data segments having time lengths which are increased in sequence until a predetermined time length is reached and which are fixed to the predetermined time length after the predetermined time length is reached, each of the plurality of continuous packet data being repeatedly transmitted through individual data transmission channels, and for entering the continuous packet data to memory means; data segment forming means for obtaining a plurality of data segments each having the predetermined time length on the basis of a portion of a predetermined amount of data in each a plurality of continuous packet data entered into the memory means; and data reproduction means for sending the plurality of data segments obtained by the data segment forming means in sequence in order to reproduce the information data.

In the data transmission method and the data transmission apparatus according to the present invention, when information data to be transmitted is divided into a plurality of data segments, the time length of each data segment is increased in sequence until a predetermined time length is reached, and after the predetermined time length is reached, the time length of each data segment is fixed to the predetermined time length. Consequently, the corresponding time lengths of a plurality of segmented packet data which is repeatedly transmitted through a plurality of data transmission channels, respectively, are increased in sequence until a predetermined time length is reached, and are fixed to the predetermined time length after the predetermined time length is reached.

As a result, on the receiving side which receives a series of segmented packet data, which reproduces the series of segmented packet data, and which obtains the original information data, the time required from when the reproduction of the first segment of the series of data segments is started until the last segment is reproduced becomes longer than that in a case where the corresponding time lengths of a plurality of data segments formed as a result of information data being divided are increased gradually from the first data segment to the last data segment. Furthermore, since the point in time when the reproduction of the last data segment of the series of data segments is started is an invariable time which is determined in such a manner as to correspond to the end point of the information data which is divided into a plurality of data segments, the point in time at which the reproduction of the first data segment of the series of data segments should be started on the received side is set as a point in time earlier than that in a case where the corresponding time lengths of a plurality of data segments formed as a result of information data being divided are increased gradually from the first data segment to the last data segment.

Therefore, in a case where, for example, content to be transmitted is live content, information data (live information data) representing the live content is divided into a plurality of data segments, and the repeated transmission of each of the plurality of the segmented packet data based on each of the plurality of data segments through individual data transmission channels is started in sequence according to a state in which the live information data arrives, a reproduction start waiting time associated with the reproduction of the live information data on the received side can be reduced.

Furthermore, in the data transmission method and the data transmission apparatus according to the present invention, when information data to be transmitted is divided into a plurality of data segments, the time length of each data segment is increased in sequence until a predetermined time length is reached, and after the predetermined time length is reached, the time length of each data segment is fixed to the predetermined time length. Consequently, the time length of a portion of a predetermined amount of data in each of a plurality of continuous packet data which is transmitted through a plurality of data transmission channels, respectively, is increased in sequence until a predetermined time length is reached, and is fixed to the predetermined time length after the predetermined time length is reached.

As a result, on the receiving side which receives a portion of a predetermined amount of data in each of a plurality of continuous packet data, which reproduces a series of data segments, and which obtains the original information data, the time required from when the reproduction of the first segment of the series of data segments is started until the last segment is reproduced becomes longer than that in a case where the corresponding time lengths of the plurality of data segments formed as a result of information data being divided are increased gradually from the first data segment to the last data segment. Furthermore, since the point in time at which the reproduction of the last data segment of the series of data segments is started is a point in time at which a time corresponding to the time length of a portion of a predetermined amount of data in the continuous packet data corresponding to the last segment of the series of data segments has passed from the end point in time of the information data which is divided into a plurality of data segments, the point in time at which the reproduction of the first data segment of the series of data segments should be started on the received side is set as a point in time earlier than that in a case where the corresponding time lengths of the plurality of data segments formed as a result of information data being divided are increased gradually from the first data segment to the last data segment.

Therefore, in a case where, for example, content to be transmitted is live content, information data (live information data) representing the live content is divided into a plurality of data segments, and the transmission each of a plurality of continuous packet data based on each of the plurality of data segments through individual data transmission channels is started in sequence according to a state in which the live information data arrives, a reproduction start waiting time associated with the reproduction of the live information data on the receiving side can be reduced.

In the data receiving method and the data receiving apparatus according to the present invention, a plurality of segmented packet data, which is repeatedly transmitted by the data transmission apparatus for use with the data transmission method according to the present invention, is received. Then, on the basis of the plurality of the received segmented packet data, data segments having time lengths which are increased in sequence until a predetermined time length is reached and which are fixed to the predetermined time length after the predetermined time length is reached are obtained in sequence. The data segments are sent in sequence, and the original information data is reproduced.

Furthermore, in the data receiving method and the data receiving apparatus according to the present invention, a portion of a predetermined amount of data in each of a plurality of continuous packet data, which is transmitted by the data transmission apparatus for use with the data transmission method according to the present invention, is received. Then, on the basis of the portion of the predetermined amount of data in each of the plurality of the received continuous packet data, data segments having time lengths which are increased in sequence until a predetermined time length is reached and which are fixed to the predetermined time length after the predetermined time length is reached are obtained in sequence. The data segments are sent in sequence, and the original information data is reproduced.

DESCRIPTION OF THE PREFERRED EMBODIMENTS

Figure 1:
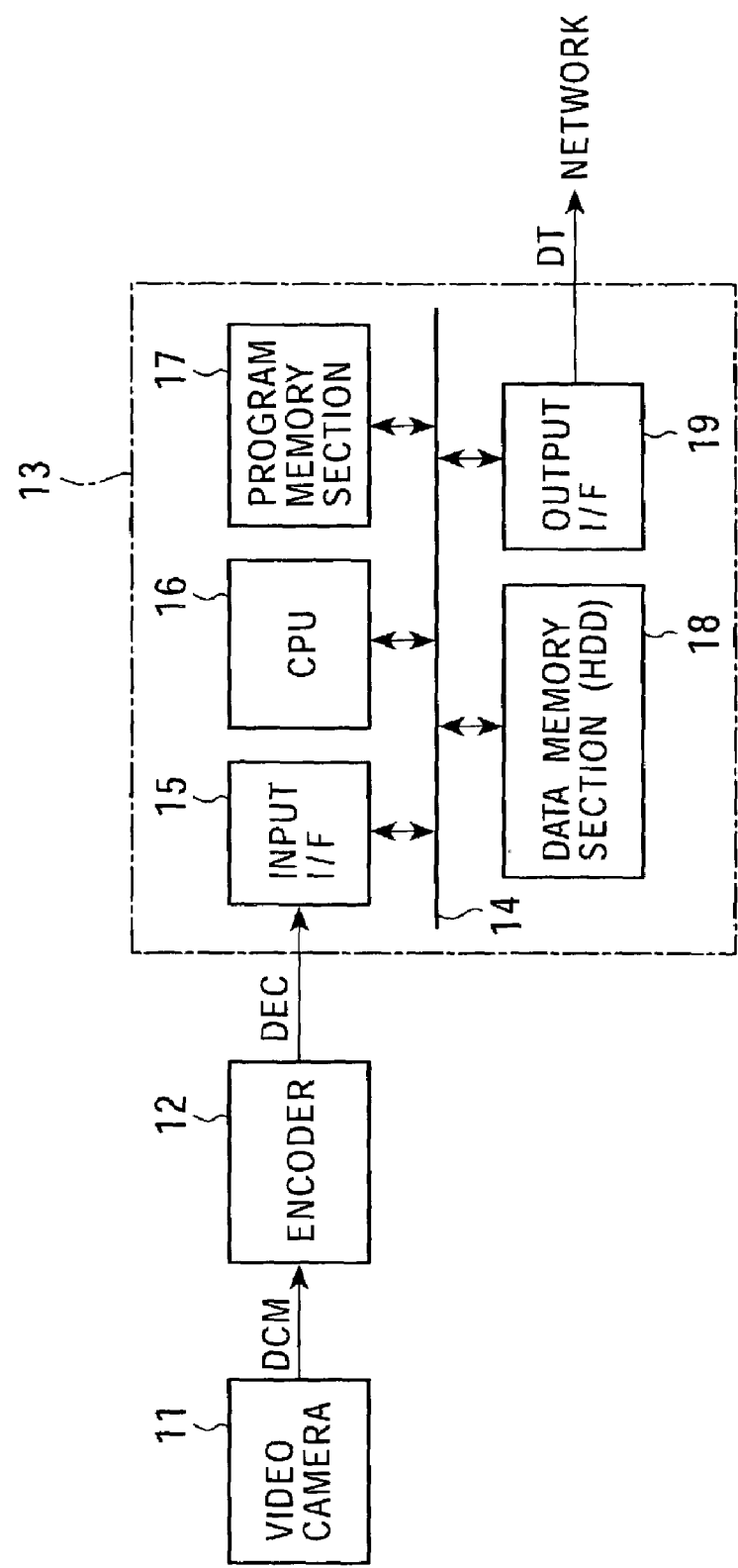
FIG. 1 is a block connection diagram showing an example of a data transmission apparatus according to the present invention for use with an example of a data transmission method according to the present invention.

FIG. 1 shows an example of a data transmission apparatus according to the present invention for use with an example of a data transmission method according to the present invention.

In the example shown in FIG. 1, a video camera 11 is provided. The video camera 11 captures an image and collects sound of a live performance of a piece of music, forms a camera output signal DCM containing video information and audio information in such a manner as to represent live information, and supplies the signal to an encoder 12. The encoder 12 performs a compression coding process in compliance with a specific method on the camera output signal DCM representing the live information, and forms, as information data, encoded data DEC representing live content based on the live performance of a piece of music. The specific method for the compression coding process used for such a case is, for example, a standard method called MPEG (Moving Picture Experts Group), which has been developed by MPEG, a task force of a technical committee in the international standardization organization, and which is approved as a standard.

The encoded data DEC obtained from the encoder 12 is supplied to a transmission server 13. The transmission server 13 has a basic configuration such that an input interface (input I/F) 15, a central processing unit (CPU) 16, a program memory section 17, a data memory section 18 formed by a hard disk drive (HDD), and an output interface (output I/F) 19 are connected to a data bus 14.

Figure 2:
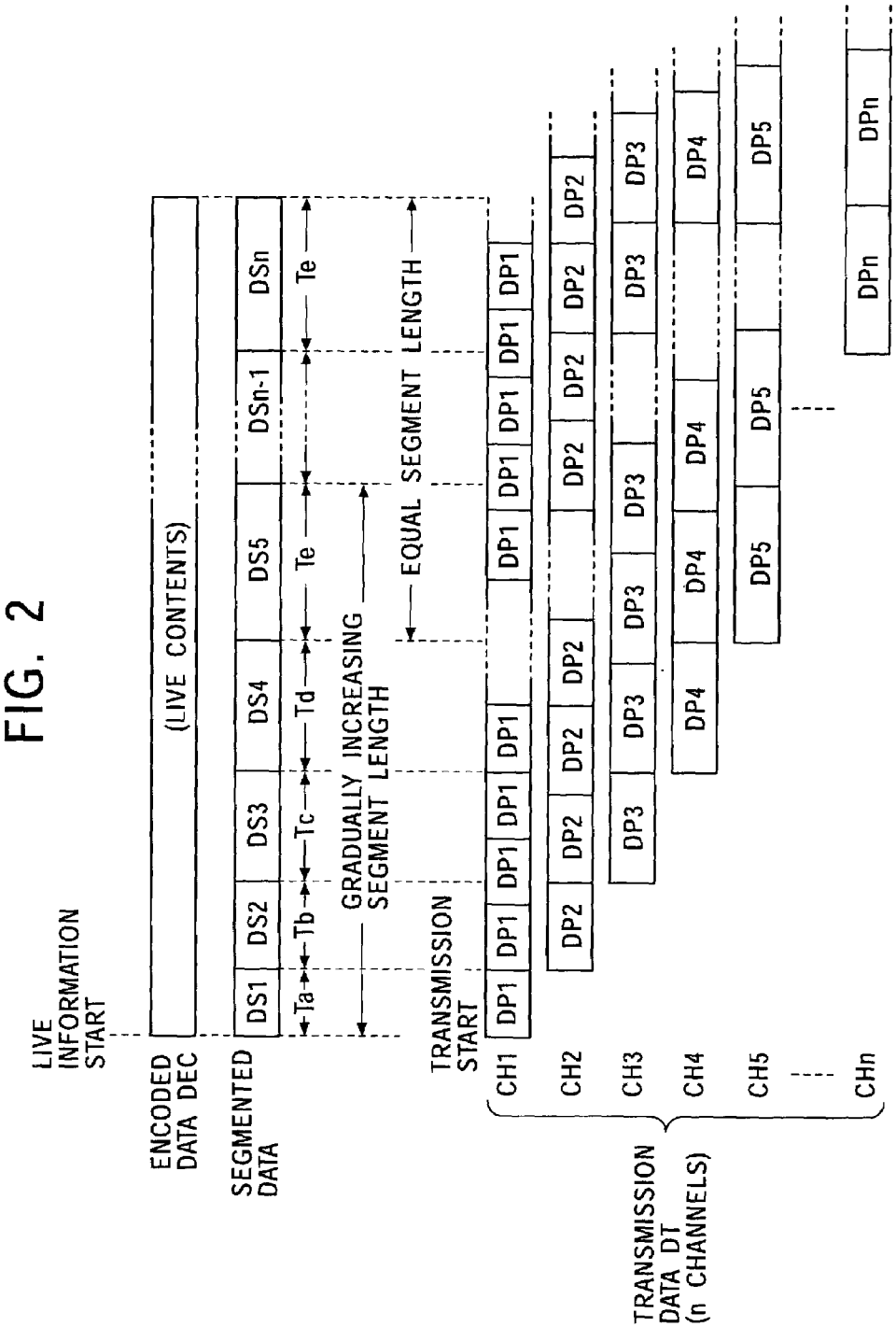
FIG. 2 is a timing chart illustrating the operation of a transmission server in the example shown in FIG. 1.

In the transmission server 13, the encoded data DEC supplied through the input I/F 15 is processed in sequence in accordance with an operation program stored in the program memory section 17 under the operation control of the CPU 16. First, the encoded data DEC is temporarily entered into the data memory section 18. Then, the encoded data DEC, such as that shown in the timing chart in FIG. 2, which is temporarily entered into the data memory section 18, is divided into a plurality of data segments DS1 to DSn, as shown in FIG. 2.

In such a case, the data segments DS1 to DSn are formed in such a manner that the first data segment DS1 has a relatively short time length Ta, the data segments DS2 to DS5 which follow the data segment DS1 have gradually increasing time lengths Tb to Te (Ta<Tb<Tc<Td<Te) (gradually increasing segment lengths), and the data segments DS6 to DSn which follow the data segment DS5 each have a fixed time length Te (equal segment length) equal to the time length Te of the data segment DS5. That is, each of the data segments DS1 to DSn has a predetermined time length, the predetermined time lengths of the data segments DS1 to DS5 are made to be time lengths which increase in sequence until a predetermined time length Te is reached, and the time length of each of the data segments DS6 to DSn after that is made to be a predetermined time length Te equal to that of the data segment DS5.

As a result, segmented data composed of the data segments DS1 to DSn is obtained. As shown in FIG. 2, the beginning of this segmented data is made to be a live information start point in synchronization with the beginning of the encoded data DEC, and the end thereof is synchronized with the end of the encoded data DEC. In a state in which the segmented data composed of the data segments DS1 to DSn is obtained in this manner, the CPU 16 transmits each of the data segments DS1 to DSn.

In a first mode of transmission of each of the data segments DS1 to DSn, performed by the CPU 16, the CPU 16 converts the data segments DS1 to DSn in sequence into a plurality of segmented packet data DP1 to DPn. Each of the segmented packet data DP1 to DPn is made to be packet stream data on which a predetermined coding process is performed.

Each of the segmented packet data DP1 to DPn has a predetermined time length, the predetermined time lengths of the segmented packet data DP1 to DP5 are made to be time lengths which increase in sequence until the predetermined time length Te is reached, and the predetermined time length of each of the segmented packet data DP6 to DPn is made to have a predetermined time length Te equal to that of the segmented packet data DP5.

Then, as the segmented packet data DP1 to DPn is formed in sequence on the basis of the data segments DS1 to DSn, the segmented packet data DP1 to DPn is sent to a network connected to the transmission server 13 through an output I/F 19 so that the segmented packet data DP1 to DPn is repeatedly transmitted through the data transmission channels CH1 to CHn, respectively.

In such a case, as shown in FIG. 2, first, repeated transmission of the segmented packet data DP1 based on the data segment DS1 through the data transmission channel CH1 is started from the live information start point which is the beginning of the data segment DS1. Then, repeated transmission of the segmented packet data DP2 based on the data segment DS2 through the data transmission channel CH2 is started from the point in time, which is the beginning of the data segment DS2. Hereafter, in a similar manner, repeated transmission of the segmented packet data DP3 to DPn based on the data segments DS3 to DSn through the data transmission channels CH3 to CHn, respectively, is started in sequence from the point in time, which is the beginning of each of the data segments DS3 to DSn.

As a result, the segmented packet data DP1 to DPn is repeatedly transmitted through the data transmission channels CH1 to CHn, respectively, and thus, n-channel parallel transmission is performed. In this manner, the segmented packet data DP1 to DPn which is repeatedly transmitted through the output I/F 19 forms transmission data DT of n channels.

Figure 3:
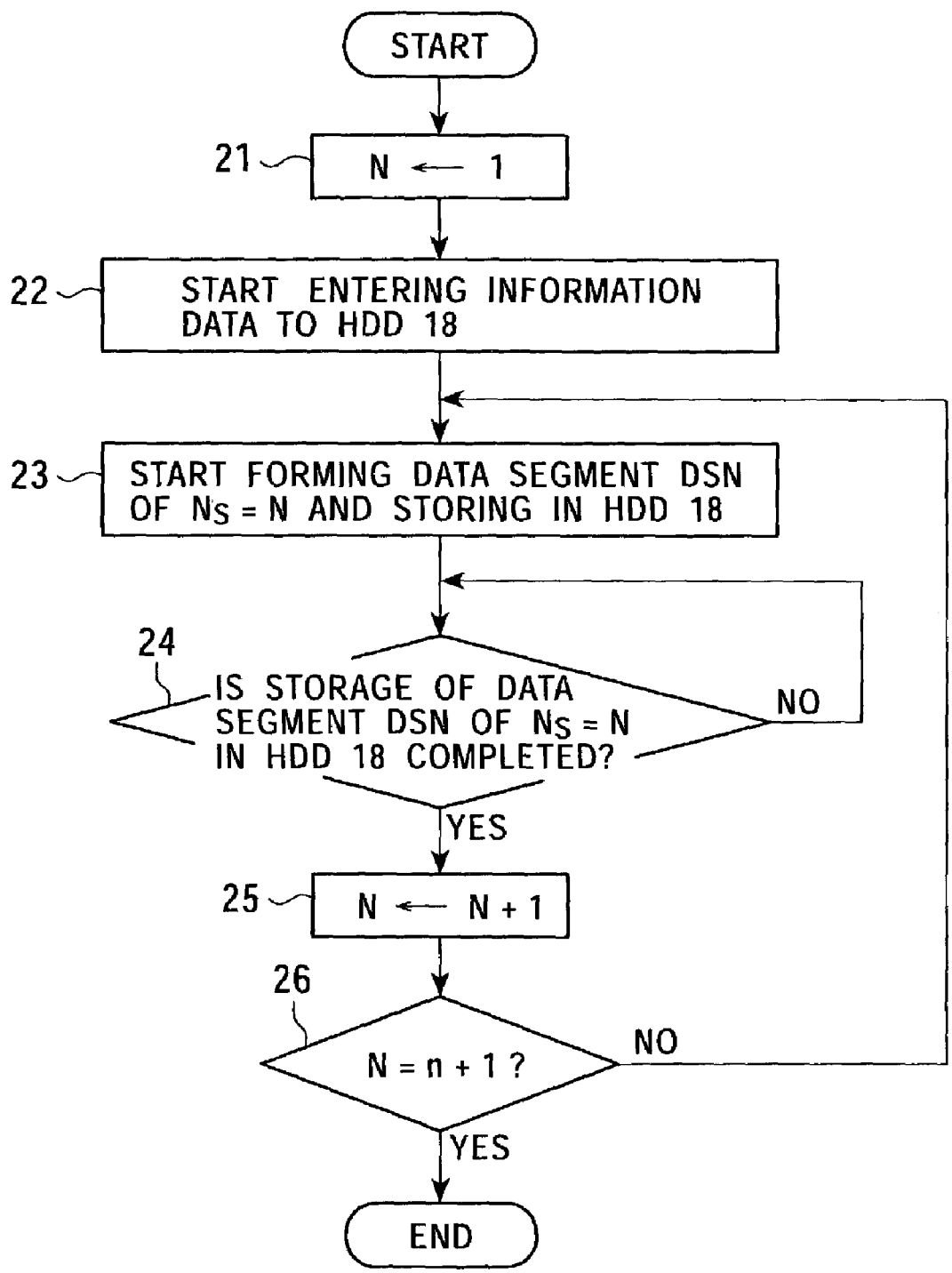
FIG. 3 is a flowchart showing an example of a program executed by a CPU incorporated in the transmission server in the example shown in FIG. 1 when the CPU performs operation control.

FIG. 3 is a flowchart showing an example of an operation program executed by the CPU 16 when the encoded data DEC, which is information data, is divided into data segments DS1 to DSn. In the operation program represented by this flowchart shown in FIG. 3, after the start, in step 21, a variable N is initialized to "1".

Next, in step 22, entry of the encoded data DEC, which is information data, into the data memory section (HDD) 18 is started. In the subsequent step 23, formation of the N-th (Ns=N) data segment DSN based on the encoded data DEC entered into the data memory section 18 and the storage into the data memory section (HDD) 18 are started, and then the process proceeds to step 24.

In step 24, it is determined whether or not the storage of the data segment DSN of Ns=N in the data memory section (HDD) 18 is completed. When the storage is not completed, the determination in step 24 is repeated. When the storage is completed, in step 25, the variable N is increased by "1", and then the process proceeds to step 26. In step 26, it is determined whether or not the variable N has reached n+1. When the variable N has not reached n+1, the process returns to step 23, where this and subsequent steps are repeated. When the variable N has reached n+1, the program is terminated.

Under such a state, in step 23 in which the data segment DSN of Ns=N is formed, the data segments DS1 to DS5 having time lengths which increase in sequence until a predetermined time length is reached, and the data segments DS6 to DSn each having a predetermined time length equal to that of the data segment DS5 are formed.

Figure 4:
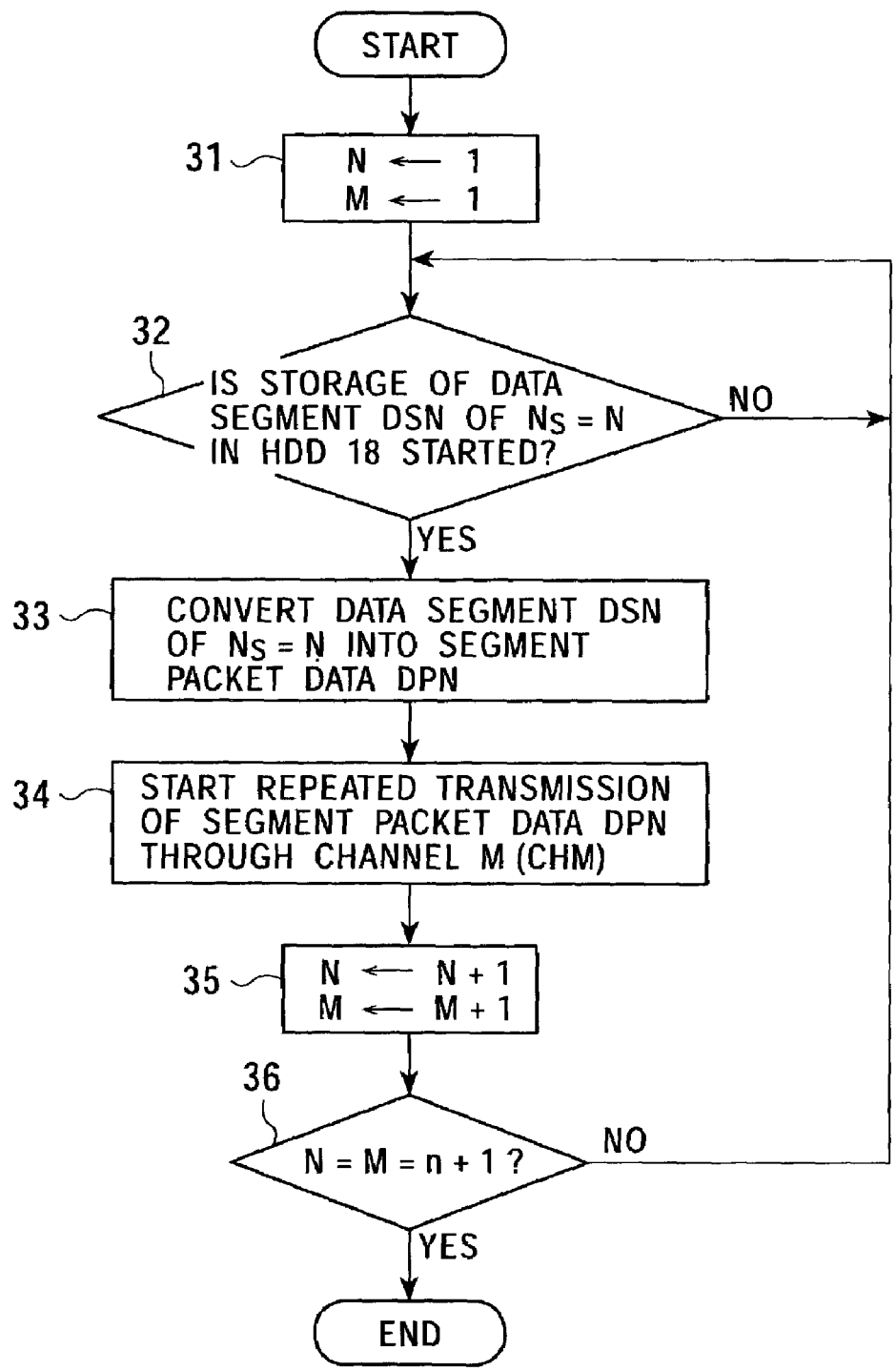
FIG. 4 is a flowchart showing an example of a program executed by the CPU incorporated in the transmission server in the example shown in FIG. 1 when the CPU performs operation control.

FIG. 4 is a flowchart showing an example of an operation program executed by the CPU 16 when the data segments DS1 to DSn are converted into the segmented packet data DP1 to DPn, respectively, and when the obtained segmented packet data DP1 to DPn is repeatedly transmitted through the data transmission channels CH1 to CHn, respectively. In the operation program represented by this flowchart shown in FIG. 4, after the start, in step 31, the variables N and M are each initialized to "1".

Next, in step 32, it is determined whether or not the storage of the data segment DSN of Ns=N into the data memory section (HDD) 18 is started. When the determination result shows that the storage of the data segment DSN of Ns=N into the data memory section 18 is not started, the determination in step 32 is repeated. When the storage of the data segment DSN of Ns=N into the data memory section 18 is started, in step 33, the data segment DSN of Ns=N is read from the data memory section 18 and is converted into segmented packet data DPN, which is packet stream data, on which a predetermined coding process is performed.

Then, in step 34, the repeated transmission of the segmented packet data DPN, obtained in step 33, through a data transmission channel M (CHM) is started.

Thereafter, in step 35, the variables N and M are each increased by "1", and then the process proceeds to step 36. In step 36, it is determined whether or not each of the variables N and M has reached n+1. If each of the variables N and M has not reached n+1, the process returns to step 32, where this and subsequent steps are repeated. If each of the variables N and M has reached n+1, the program is terminated.

In such a state, in step 33 in which the data segment DSN of Ns=N is converted into segmented packet data DPN, the segmented packet data DP1 to DP5 having time lengths which increase in sequence until a predetermined time length is reached, and the segmented packet data DP6 to DPn each having a predetermined time length equal to that of the segmented packet data DP5 are formed.

In the manner described above, in the example shown in FIG. 1, in the first mode of transmission of each of the data segments DS1 to DSn, performed by the CPU 16, the encoded data DEC representing live content which is information data to be transmitted is divided into the data segments DS1 to DSn such that the data segments DS1 to DS5 have time lengths which increase in sequence until a predetermined time length is reached and the data segments DS6 to DSn following that have a fixed time length equal to that of the data segment DS5. The data segments DS1 to DSn are converted into segmented packet data DP1 to DPn, respectively, and are repeatedly transmitted through the data transmission channels CH1 to CHn, respectively. At this time, repeated transmission of each of the segmented packet data DP1 to DPn is started in sequence according to a state in which the encoded data DEC arrives in the transmission server 13. As a result, on the receiving side which receives a series of segmented packet data DP1 to DPn in order to obtain a series of data segments DS1 to DSn and which reproduces the original encoded data DEC, a reproduction start waiting time associated with the reproduction of the encoded data DEC is reduced.

Furthermore, in a second mode of transmission of each of the data segments DS1 to DSn, performed by the CPU 16, the CPU 16 converts the data segments DS1 to DSn in sequence into a plurality of continuous packet data DLT1 to DLTn, respectively, and continuously transmits the data through the data transmission channels CH1 to CHn, respectively.

The continuous packet data DLT1 is formed by a nearly infinite continuous packet stream, obtained by performing a specific coding process, which is the above-described LT coding process, on the data segment DS1. Such a packet stream is formed so as to be capable of reproducing the original data segment DS1 from one of the portions having a predetermined amount of data corresponding to approximately 105% of the data segment DS1 within that packet stream. The portion having the predetermined amount of data has a time length corresponding to the time length of the data segment DS1.

Similarly to the continuous packet data DLT1, each of the continuous packet data DLT2 to DLTn is also formed by a nearly infinite continuous packet stream, obtained by performing a specific coding process, which is the above-described LT coding process, on the data segments DS2 to DSn, respectively. Each of these packet streams is formed so as to be capable of reproducing one of the original data segments DS2 to DSn from one of the portions having a predetermined amount of data corresponding to approximately 105% of one of the data segments DS2 to DSn within that packet stream. Such portions having the predetermined amount of data have time lengths corresponding to the time lengths of the data segments DS2 to DSn, respectively.

Then, the continuous packet data DLT1 to DLTn are sent to a network connected to the transmission server 13 through the output I/F 19 so that the continuous packet data DLT1 to DLTn are transmitted through the data transmission channels CH1 to CHn, respectively.

Figure 5:
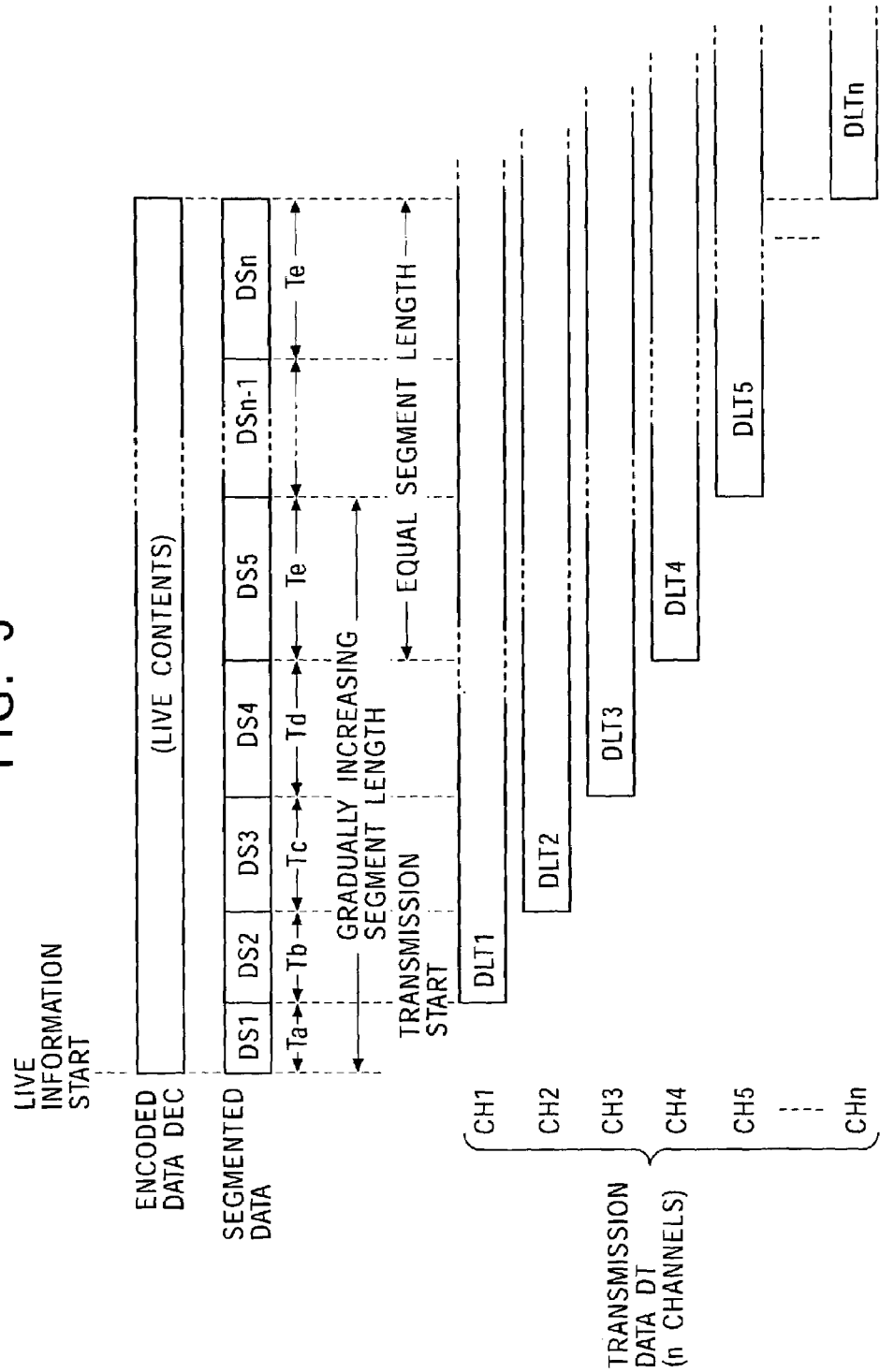
FIG. 5 is a timing chart illustrating the operation of the transmission server in the example shown in FIG. 1.

In such a case, for example, as shown in FIG. 5, the CPU 16 first starts the conversion of the data segment DS1 into the continuous packet data DLT1 and the transmission thereof through the data transmission channel CH1 when the formation of the data segment DS1 is completed. Then, the conversion of the data segment DS2 into the continuous packet data DLT2 and the transmission thereof through the data transmission channel CH2 are started when the formation of the data segment DS2 is completed. Hereafter, in a similar manner, the conversion of each of the data segments DS3 to DSn into each of the continuous packet data DLT3 to DLTn and the transmission thereof through each of the data transmission channels CH3 to CHn are started in sequence when the formation of each of the data segments DS3 to DSn is completed.

As a result, the continuous packet data DLT1 to DLTn is transmitted through the data transmission channels CH1 to CHn, respectively, and thus, n-channel parallel transmission is performed. In this manner, the continuous packet data DLT1 to DLTn which is repeatedly transmitted through the output I/F 19 forms transmission data DT of n channels.

Figure 6:
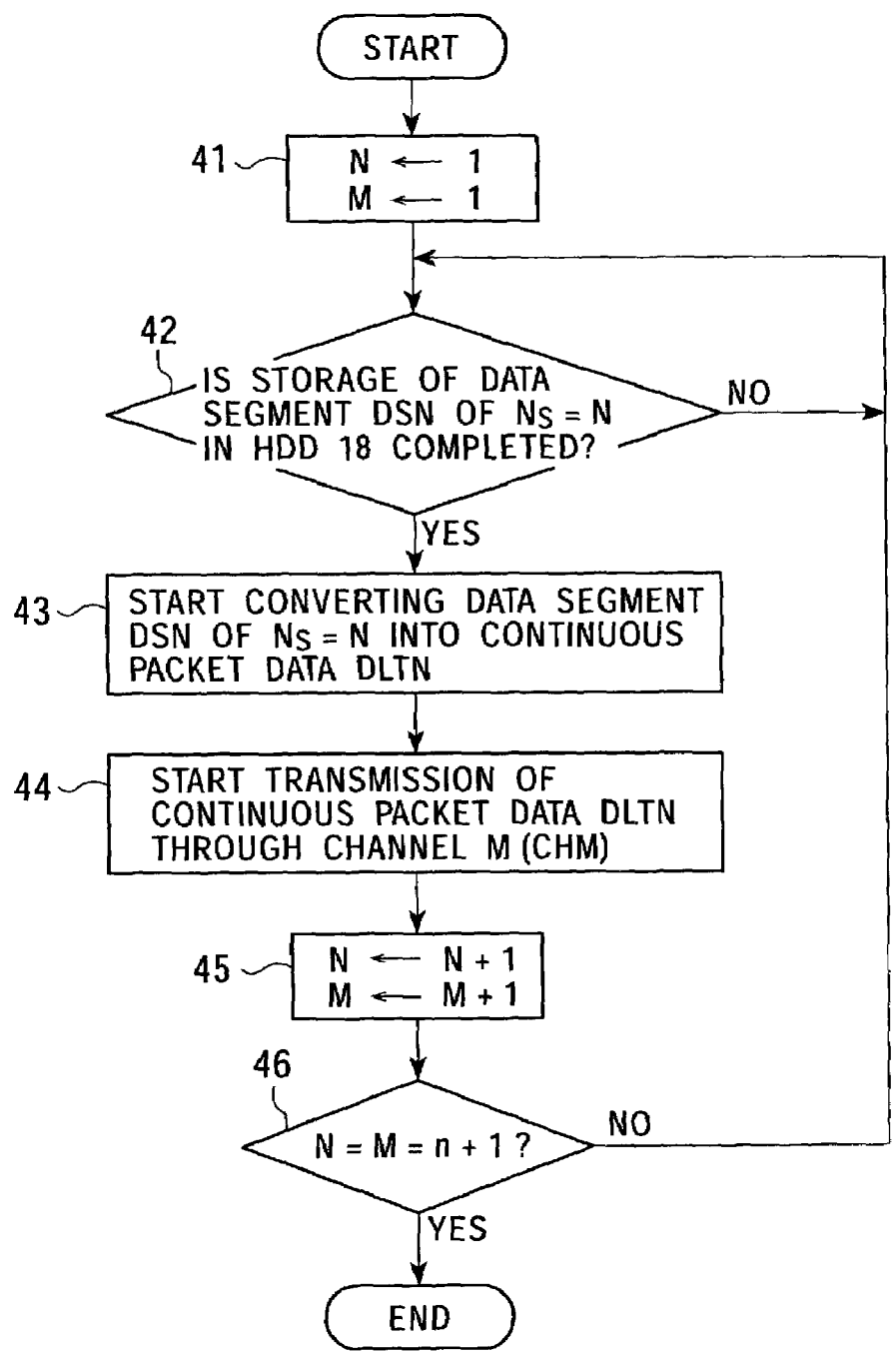
FIG. 6 is a flowchart showing an example of a program executed by the CPU incorporated in the transmission server in the example shown in FIG. 1 when the CPU performs operation control.

FIG. 6 is a flowchart showing an example of an operation program performed by the CPU 16 when the CPU 16 converts data segments DS1 to DSn into continuous packet data DLT1 to DLTn, respectively, and transmits the obtained continuous packet data DLT1 to DLTn through the data transmission channels CH1 to CHn, respectively.

In the operation program represented by this flowchart shown in FIG. 6, after the start, in step 41, the variables N and M are each initialized to "1".

Next, in step 42, it is determined whether or not the storage of the data segments DSN of Ns=N into the data memory section (HDD) 18 is completed. When the determination result shows that the storage of the data segment DSN of Ns=N into the data memory section 18 is not completed, the determination in step 42 is repeated. When the storage of the data segment DSN of Ns=N into the data memory section 18 is completed, in step 43, the data segment DSN of Ns=N is read from the data memory section 18, and a conversion into continuous packet data DLTN, formed of a nearly infinite continuous packet stream, obtained by performing a specific coding process thereon, is started. In the subsequent step 44, transmission of the continuous packet data DLTN whose conversion is started through the data transmission channel M (CHM) is started.

Thereafter, in step 45, the variables N and M are each increased by "1", and then the process proceeds to step 46. In step 46, it is determined whether or not each of the variables N and M has reached n+1. If each of the variables N and M has not reached n+1, the process returns to step 42, where this and subsequent steps are repeated. If each of the variables N and M has reached n+1, the program is terminated.

In the manner described above, in the example shown in FIG. 1, also, in a second mode of transmission of each of the data segments DS1 to DSn, performed by the CPU 16, the encoded data DEC representing content which is information data to be transmitted is divided into data segments DS1 to DSn such that the data segments DS1 to DS5 have time lengths which are increased in sequence until a predetermined time length is reached and such that the data segments DS6 to DSn after that have a fixed time length equal to that of the data segment DS5, the data segments DS1 to DSn are converted into continuous packet data DLT1 to DLTn, respectively, and the data is transmitted through the data transmission channels CH1 to CHn. In this case, the transmission of each of the continuous packet data DLT1 to DLTn is started in sequence according to a state in which the encoded data DEC arrives in the transmission server 13. As a result, on the receiving side which receives a portion of a predetermined amount of data in each of a series of continuous packet data DLT1 to DLTn in order to obtain a series of data segments DS1 to DSn and which reproduces the original encoded data DEC, a reproduction start waiting time associated with the reproduction of the encoded data DEC is reduced.

Figure 7:
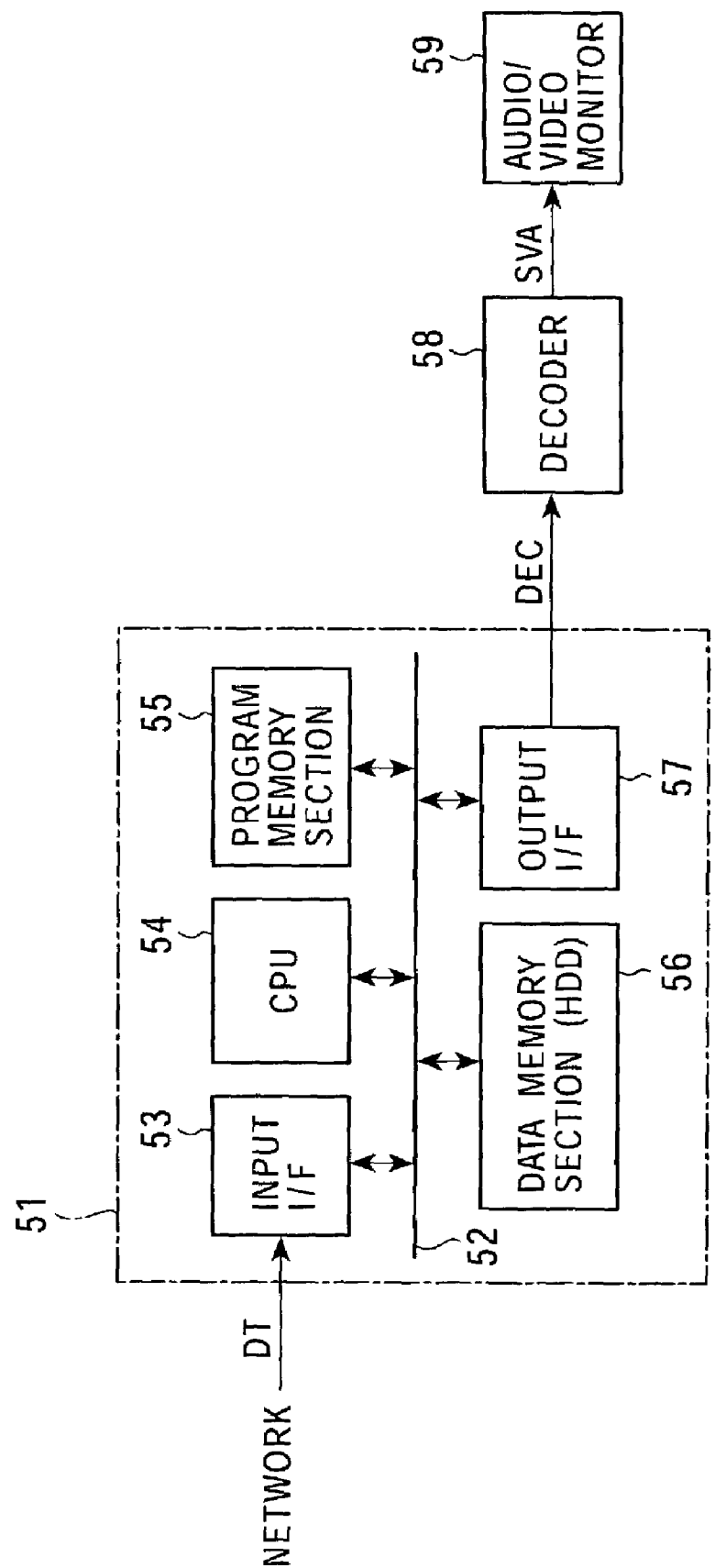
FIG. 7 is a block connection diagram showing an example of a data receiving apparatus according to the present invention for use with an example of a data receiving method according to the present invention.

FIG. 7 shows an example of a data receiving apparatus according to the present invention for use with an example of a data receiving method according to the present invention.

In the example shown in FIG. 7, a receiving server 51 for receiving transmission data DT sent in the example shown in FIG. 1 is provided. The receiving server 51 has a basic configuration such that an input interface (input I/F) 53, a central processing unit (CPU) 54, a program memory section 55, a data memory section 56 formed by a hard disk drive (HDD), and an output interface (output I/F) 57 are connected to a data bus 52.

Figure 8:
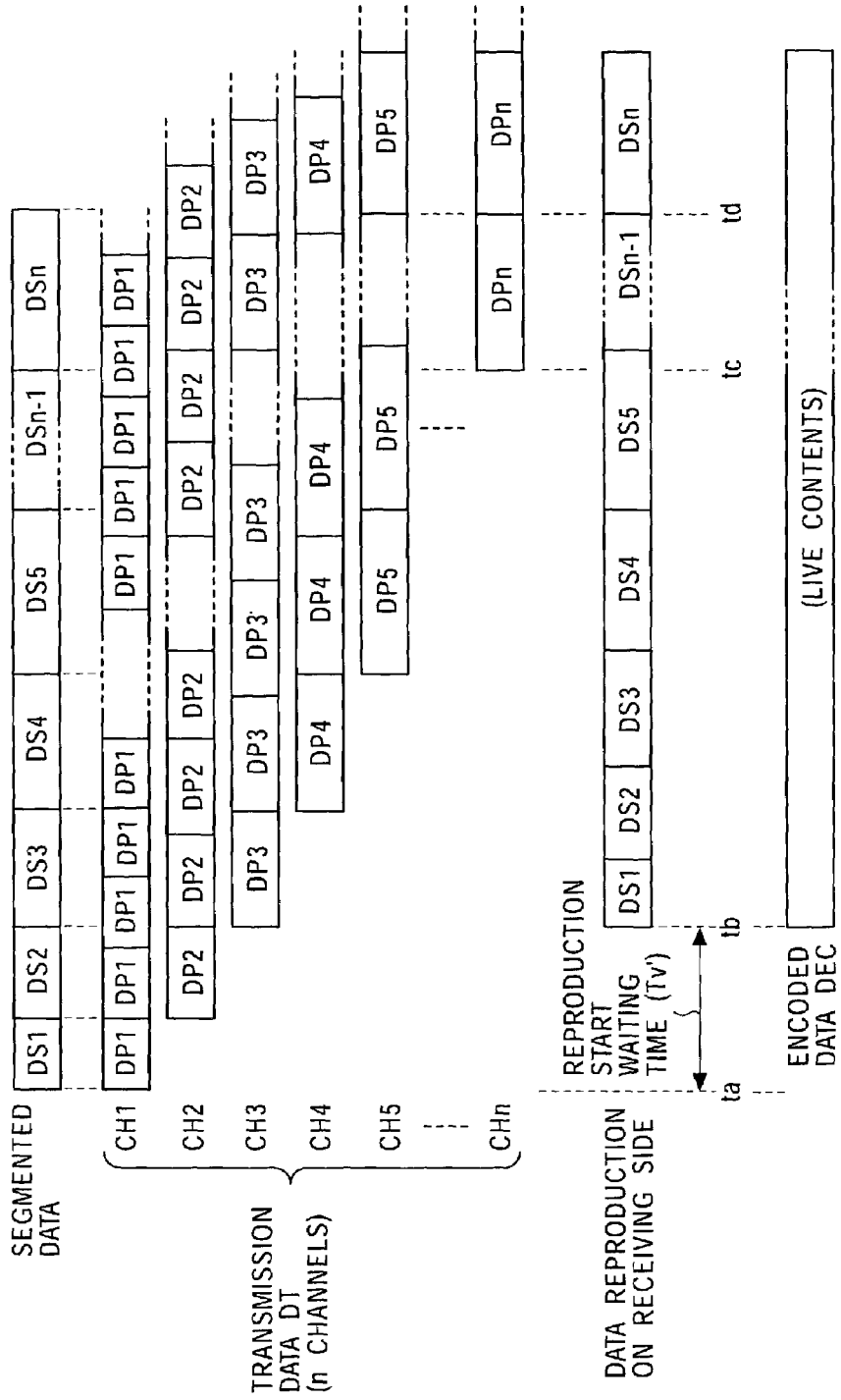
FIG. 8 is a timing chart illustrating the operation of a receiving server in the example shown in FIG. 7.

In a case where, as shown in FIG. 2, the transmission data DT sent in the example shown in FIG. 1 is such that the segmented packet data DP1 to DPn is repeatedly transmitted through the data transmission channels CH1 to CHn, respectively, in the receiving server 51, as shown in the timing chart in FIG. 8, each of the segmented packet data DP1 to DPn, supplied through the input I/F 53, which is repeatedly transmitted through the data transmission channels CH1 to CHn, is processed in sequence in accordance with an operation program stored in the program memory section 55 under the operation control of the CPU 54. First, the segmented packet data DP1 to DPn which is repeatedly transmitted through the data transmission channels CH1 to CHn is received and is temporarily entered into the data memory section (HDD) 56.

In such a case, according to the starting sequence of the repeated transmission of each of the segmented packet data DP1 to DPn in the example shown in FIG. 1, first, the time, shown in FIG. 8, corresponding to the beginning of the segmented data supplied in the example of FIG. 1, that is, at time ta corresponding to the transmission starting time of the segmented packet data DP1, entry of the segmented packet data DP1 into the data memory section 56 is started. Thereafter, at a time corresponding to the transmission starting time of each of the segmented packet data DP2 to DPn, entry of the segmented packet data DP2 to DPn into the data memory section 56 is started in sequence.

In such a situation, operations such as those shown in FIG. 8 are started. That is, at time tb in which a reproduction start waiting time Tv' which is set in advance has passed from time ta, the segmented packet data DP1 entered into the data memory section 56 is read from the data memory section 56. By performing a predetermined decoding process on packet stream data, which forms the packet data, on which a predetermined coding process is performed, a data segment DS1 is obtained. Subsequently, each of the segmented packet data DP2 to DPn entered into the data memory section 56 is read from the data memory section 56. By performing a predetermined decoding process on the packet stream data, which forms the segmented packet data, on which a predetermined coding process is performed, data segments DS2 to DSn are continuously obtained in sequence.

The data segments DS1 to DSn which are continuously obtained in sequence by the operations which are started in this manner are sent in sequence, and the original encoded data DEC representing live content is reproduced.

In the manner described above, as a result of starting an operation for obtaining the data segment DS1 at time tb when a preset reproduction start waiting time Tv' has passed from time ta, an operation for obtaining the data segment DSn based on the first data of the segmented packet data DPn which is repeatedly transmitted, which is entered into the data memory section 56 at time tc shown in FIG. 8 can be started at time td when the entry of the segmented packet data DPn into the data memory section 56 is completed. The time td corresponds to the end of the segmented data in the example shown in FIG. 1, that is, the time of the end of the data segment DSn.

More specifically, the reproduction start waiting time Tv' is set in advance so that, at time tb, an operation for obtaining the data segment DS1 is started to obtain the data segments DS1 to DSn−1 in sequence, thereafter, at time td, an operation for obtaining the data segment DSn based on the first data of the segmented packet data DPn which is repeatedly transmitted can be started, making it possible to continuously obtain the data segments DS1 to DSn. Such a reproduction start waiting time Tv' is computed as a time from time ta corresponding to the beginning of the segmented data supplied in the example shown in FIG. 1 up to the computed time tb, which is earlier by an amount of time required to continuously obtain the data segments DS1 to DSn−1 than time td corresponding to the end of the segmented data supplied in the example shown in FIG. 1.

Figure 16:
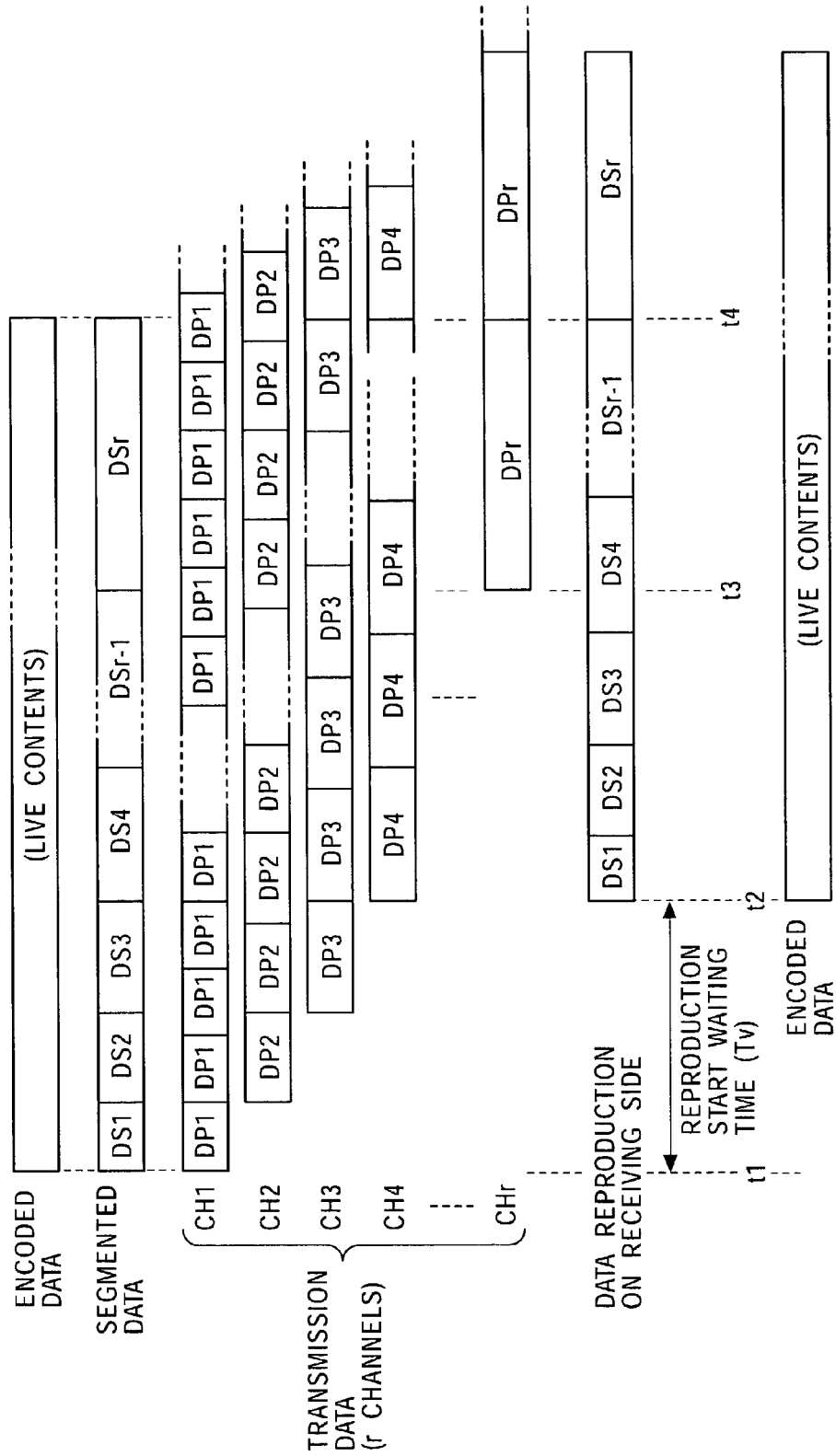
FIG. 16 is a timing chart showing an example of data transmission of an on-demand form in which content to be transmitted is live information and in which an unequal-length division technique and a repeated transmission technique are used.

The reproduction start waiting time Tv' is reduced in comparison with the reproduction start waiting time Tv in a case where the data segments DS1 to DSn which form the encoded data DEC to be reproduced are formed such that the data segments DS1 to DS5 among them have time lengths which are increased in sequence until a predetermined time length is reached and the data segments DS6 to DSn after that each have a fixed time length equal to that of the data segment DS5, and as a result, for example, as shown in FIG. 16, the corresponding time lengths of the data segments DS1 to DSr which forms the encoded data to be reproduced are increased gradually from the first segment to the last segment.

Figure 9:
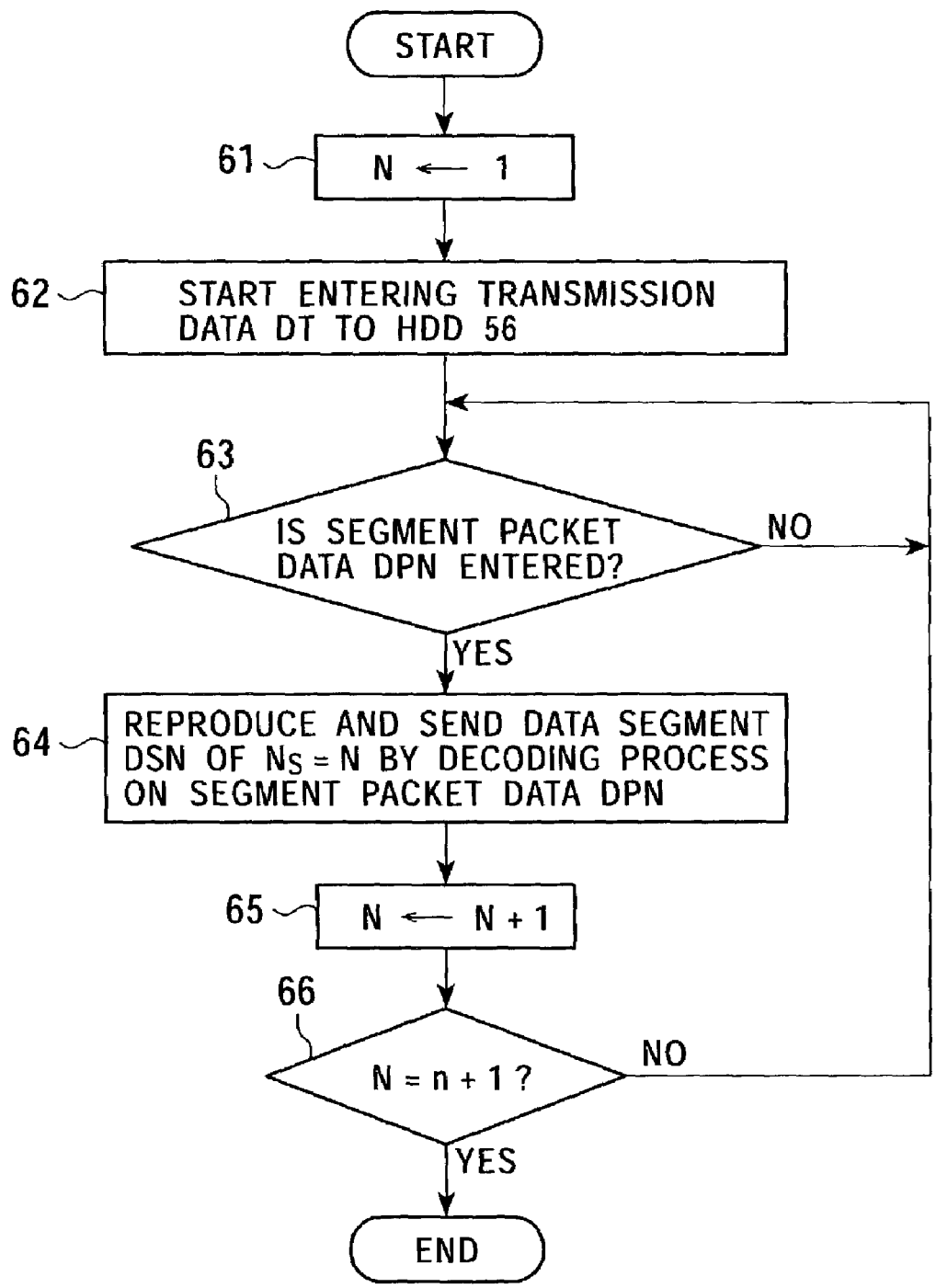
FIG. 9 is a flowchart showing an example of a program executed by a CPU incorporated in the receiving server in the example shown in FIG. 7 when the CPU performs operation control.

FIG. 9 is a flowchart showing an example of an operation program executed by the CPU 54 in the receiving server 51 when the CPU 54 enters the segmented packet data DP1 to DPn which form the transmission data DT of n channels into the data memory section (HDD) 56, converts the segmented packet data DP1 to DPn into data segments DS1 to DSn, respectively, and reproduces the encoded data DEC. In the operation program represented by this flowchart shown in FIG. 9, after the start, in step 61, the variable N is initialized to "1".

Next, in step 62, entry of the segmented packet data DP1 to DPn, supplied through the input I/F 53, which forms the transmission data DT of n channels and which is repeatedly transmitted through the data transmission channels CH1 to CHn, into the data memory section 56 is started.

Then, in step 63, it is determined whether or not the segmented packet data DPN of Ns=N is entered into the data memory section 56. When the determination result shows that the segmented packet data DPN is not entered into the data memory section 56, the determination in step 63 is repeated. When the segmented packet data DPN is entered into the data memory section 56, in step 64, the segmented packet data DPN is read from the data memory section 56, a predetermined decoding process is performed on the packet stream data, which forms the segmented packet data DPN, on which a predetermined coding process is performed, in order to reproduce the data segment DSN from the segmented packet data DPN, and the obtained data segment DSN is sent.

Thereafter, in step 65, the variable N is increased by "1", and then the process proceeds to step 66. In step 66, it is determined whether or not the variable N has reached n+1. When the variable N has not reached n+1, the process returns to step 63, where this and subsequent steps are repeated. When the variable N has reached n+1, the program is terminated.

Figure 10:
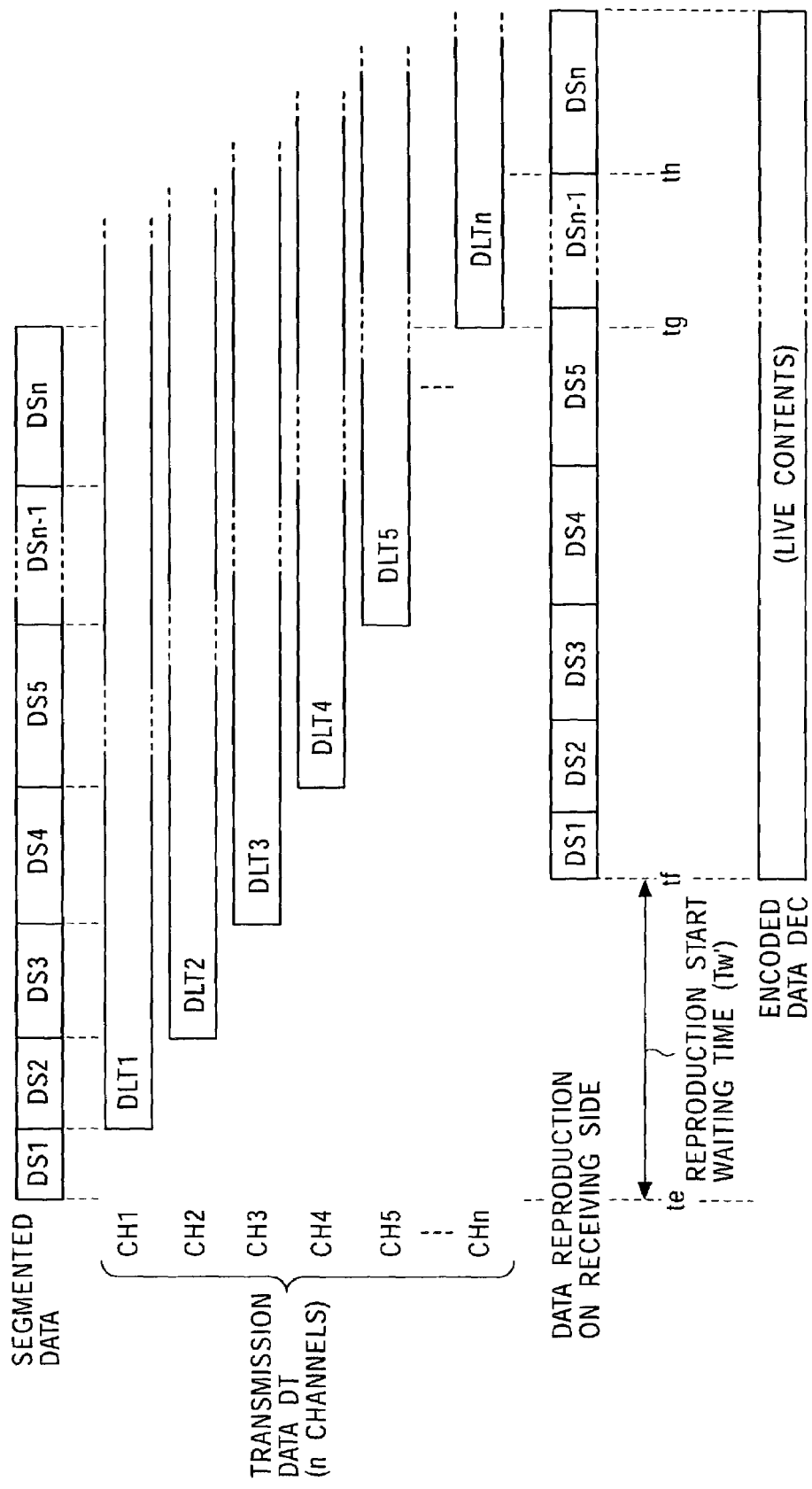
FIG. 10 is a timing chart illustrating the operation of the receiving server in the example shown in FIG. 7.

Furthermore, in a case where the transmission data DT sent in the example shown in FIG. 1 is formed in such a way that, as shown in FIG. 5, the continuous packet data DLT1 to DLTn is transmitted through the data transmission channels CH1 to CHn, respectively, in the receiving server 51, as shown in the timing chart in FIG. 10, each of the continuous packet data DLT1 to DLTn, supplied through the input I/F 53, which is transmitted through the data transmission channels CH1 to CHn, is processed in sequence in accordance with the operation program stored in the program memory section 55 under the operation control of the CPU 54. First, the continuous packet data DLT1 to DLTn which is transmitted through the data transmission channels CH1 to CHn is received and is temporarily entered into the data memory section (HDD) 56.

In such a case, according to the starting sequence of the transmission of each of the continuous packet data DLT1 to DLTn in the example shown in FIG. 1, first, at a time in which a time until the formation of the data segment DS1 is completed has passed from time te corresponding to the beginning of the segmented data supplied in the example of FIG. 1, that is, at the time corresponding to the transmission starting time of the continuous packet data DLT1, entry of the continuous packet data DLT1 into the data memory section 56 is started. Thereafter, at a time corresponding to each of the transmission starting points of each of the continuous packet data DLT1 to DLTn, entry of the continuous packet data DLT2 to DLTn into the data memory section 56 is started in sequence.

In such a situation, operations such as those shown in FIG. 10 are started. That is, at time tf in which the reproduction start waiting time Tw' which is set in advance has passed from time te, a portion of a predetermined amount of data in the continuous packet data DLT1 entered into the data memory section 56 is read from the data memory section 56. By performing a specific decoding process on packet stream data, which forms the data, on which a specific coding process is performed, the data segment DS1 is obtained. Subsequently, each of the continuous packet data DLT2 to DLTn entered into the data memory section 56 is read from the data memory section 56, and by performing a specific decoding process on packet stream data, which forms the continuous packet data, on which a specific coding process is performed, the data segments DS2 to DSn are continuously obtained in sequence.

The data segments DS1 to DSn which are continuously obtained in sequence according to the operations which are started in this manner are sent in sequence, and the original encoded data DEC representing live content is reproduced.

As described above, as a result of starting an operation for obtaining the data segment DS1 at time tf when a preset reproduction start waiting time Tw' has passed from time te, an operation for obtaining the data segment DSn based on the portion of the predetermined amount of data of the continuous packet data DLTn, which is obtained first, which is entered into the data memory section 56 at time tg shown in FIG. 10 can be started at time th when the entry of the portion of the predetermined amount of data in the continuous packet data DLTn into the data memory section 56 is completed. The time th is a time when a time corresponding to the time length of the portion of the predetermined amount of data of the continuous packet data DLTn, which is obtained first, has passed from the end of the segmented data supplied in the example shown in FIG. 1, that is, time tg of the end of the segmented data DSn.

More specifically, the reproduction start waiting time Tw' is set in advance so that, at time tf, as a result of starting an operation for obtaining the data segment DS1, the data segments DS1 to DSn−1 are obtained in sequence, thereafter, at time th, an operation for obtaining the data segment DSn based on the first portion of the predetermined amount of data of the continuous packet data DLTn which is transmitted can be started, making it possible to continuously obtain the data segments DS1 to DSn. Such a reproduction start waiting time Tw' is computed as a time from time te corresponding to the beginning of the segmented data supplied in the example shown in FIG. 1 up to the computed time tf, which is earlier by an amount of time required to continuously obtain the data segments DS1 to DSn−1 than time th in which the time corresponding to the time length of the portion of the predetermined amount of data of continuous packet data DLTn, which is obtained first, has passed from time tg corresponding to the end of the segmented data supplied in the example shown in FIG. 1.

Figure 17:
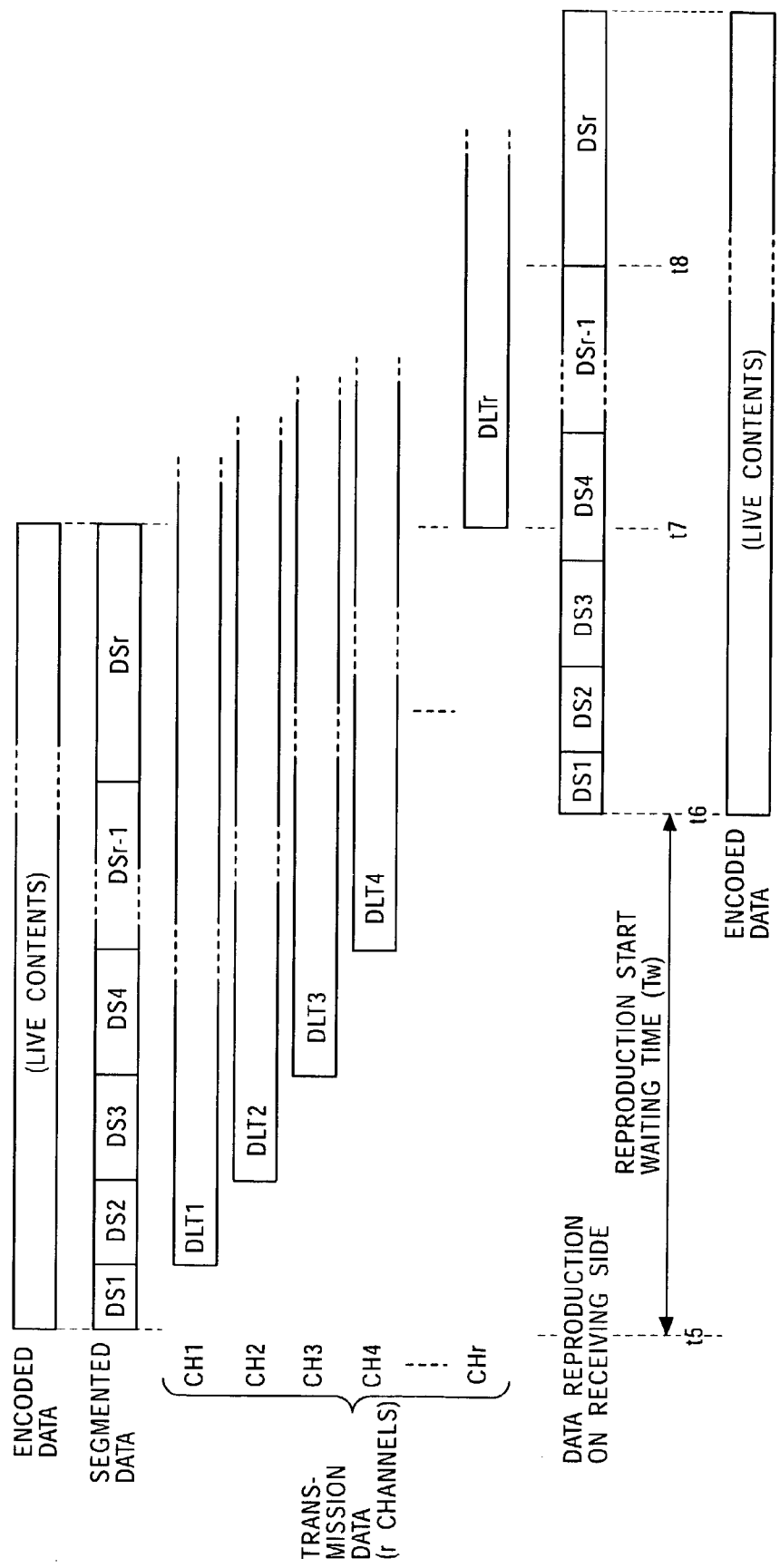
FIG. 17 is a timing chart illustrating data transmission of an on-demand form in which content to be transmitted is live information and in which an unequal-length division technique and a continuous transmission technique are used.

Furthermore, the data segments DS1 to DSn which form the encoded data DEC to be reproduced are formed such that the data segments DS1 to DS5 among them have time lengths which are increased in sequence until a predetermined time length is reached and the data segments DS6 to DSn after that have time lengths equal to that of the data segment DS5. As a result, the reproduction start waiting time Tw' is reduced in comparison with the reproduction start waiting time Tw in a case where, for example, as shown in FIG. 17, the corresponding time lengths of the data segments DS1 to DSr which form the encoded data to be reproduced are increased gradually from the first segment to the last segment.

Figure 11:
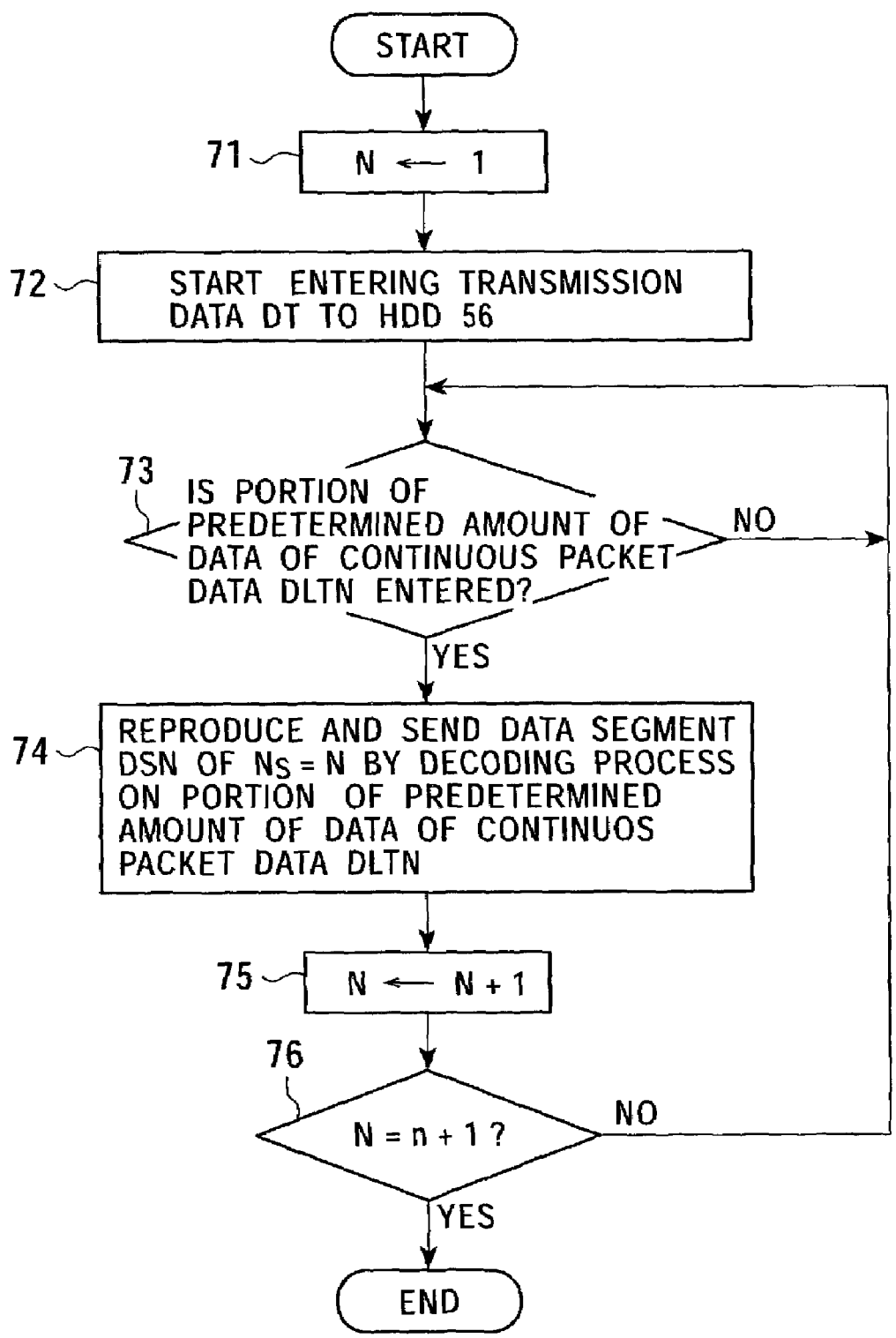
FIG. 11 is a flowchart showing an example of a program executed by the CPU incorporated in the receiving server in the example shown in FIG. 7 when the CPU performs operation control.
Figure 12:
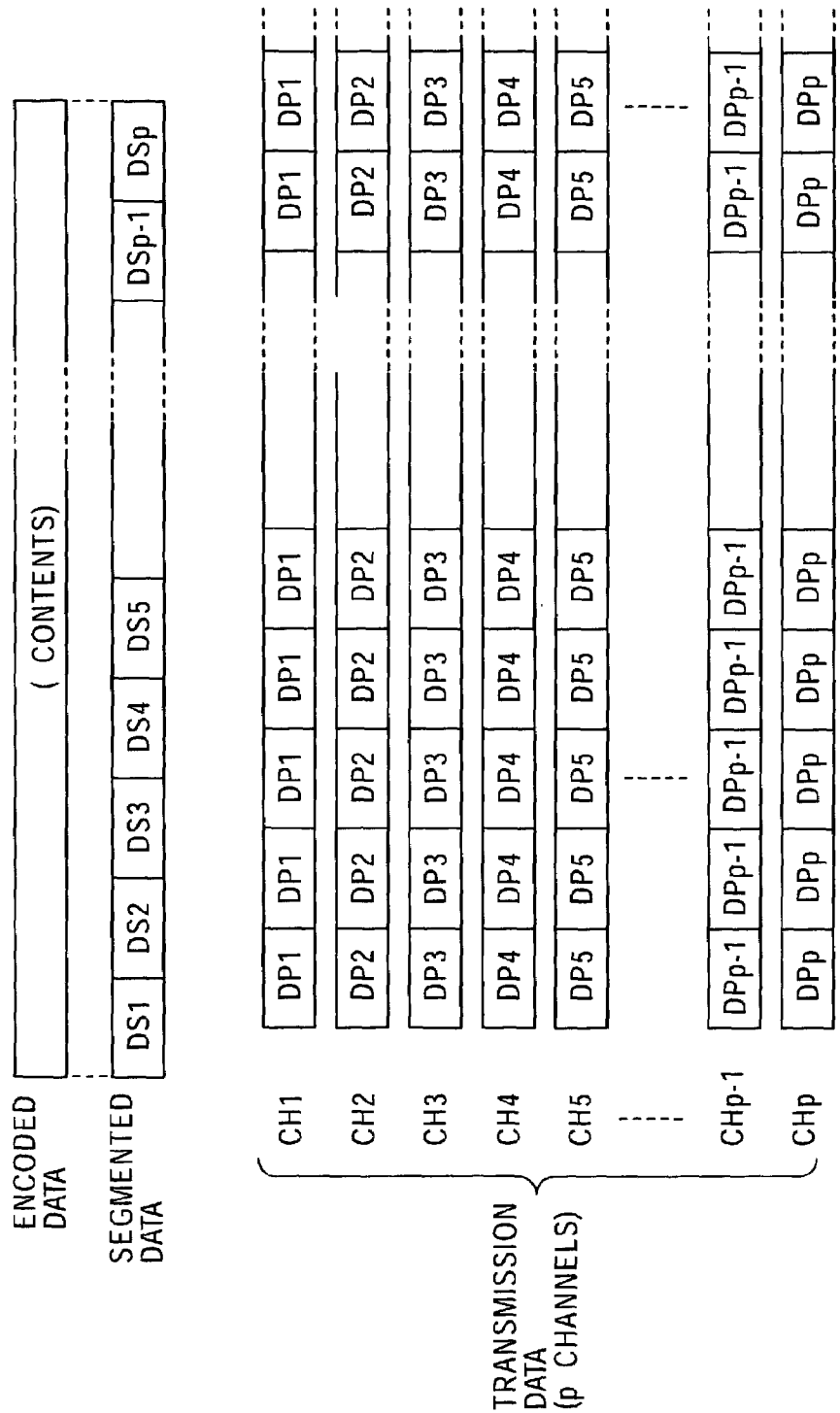
FIG. 12 is a timing chart illustrating data transmission of an on-demand form in which an equal-length division technique and a repeated transmission technique are used.
Figure 13:
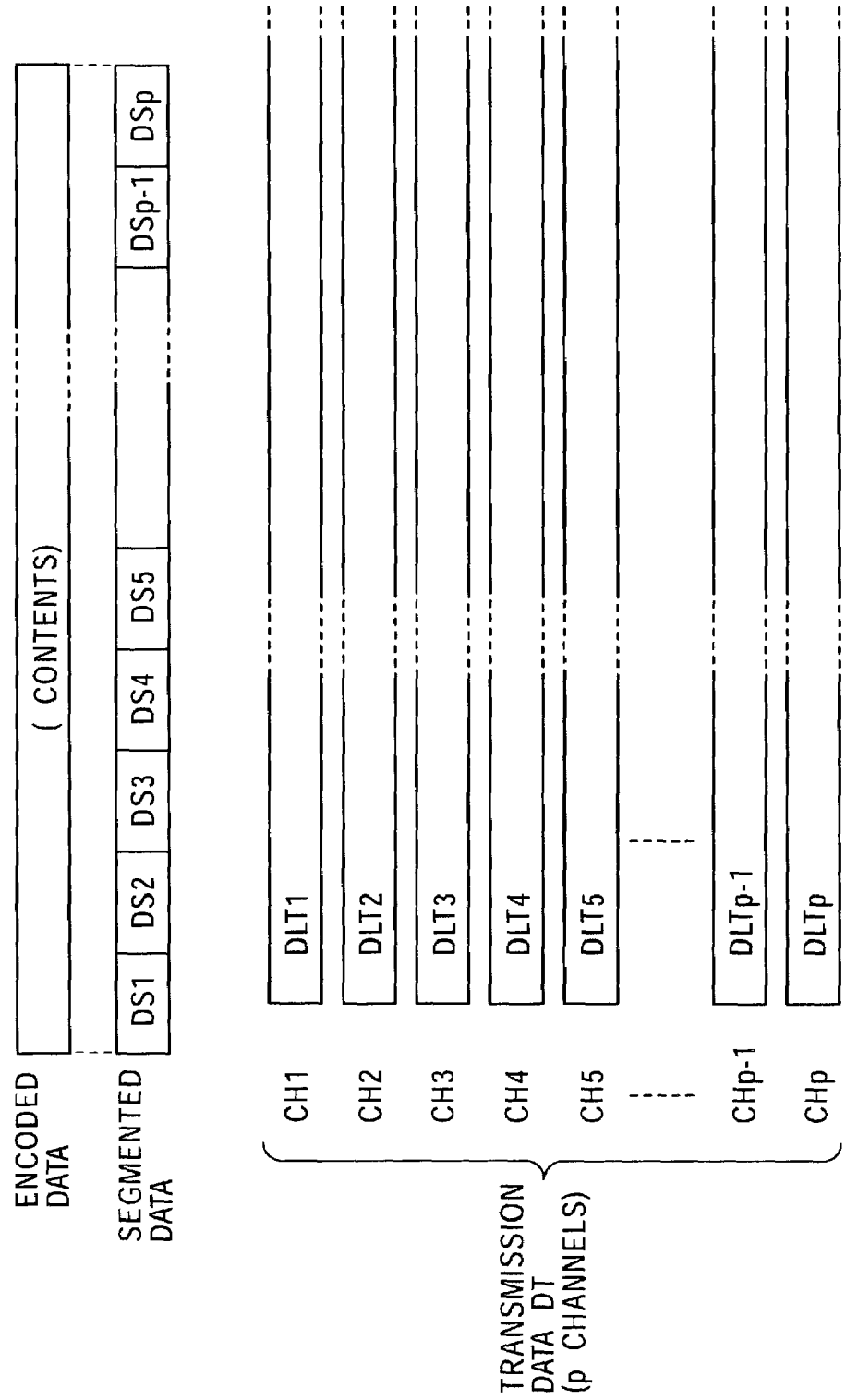
FIG. 13 is a timing chart illustrating data transmission of an on-demand form in which an equal-length division technique and a continuous transmission technique are used.
Figure 14:
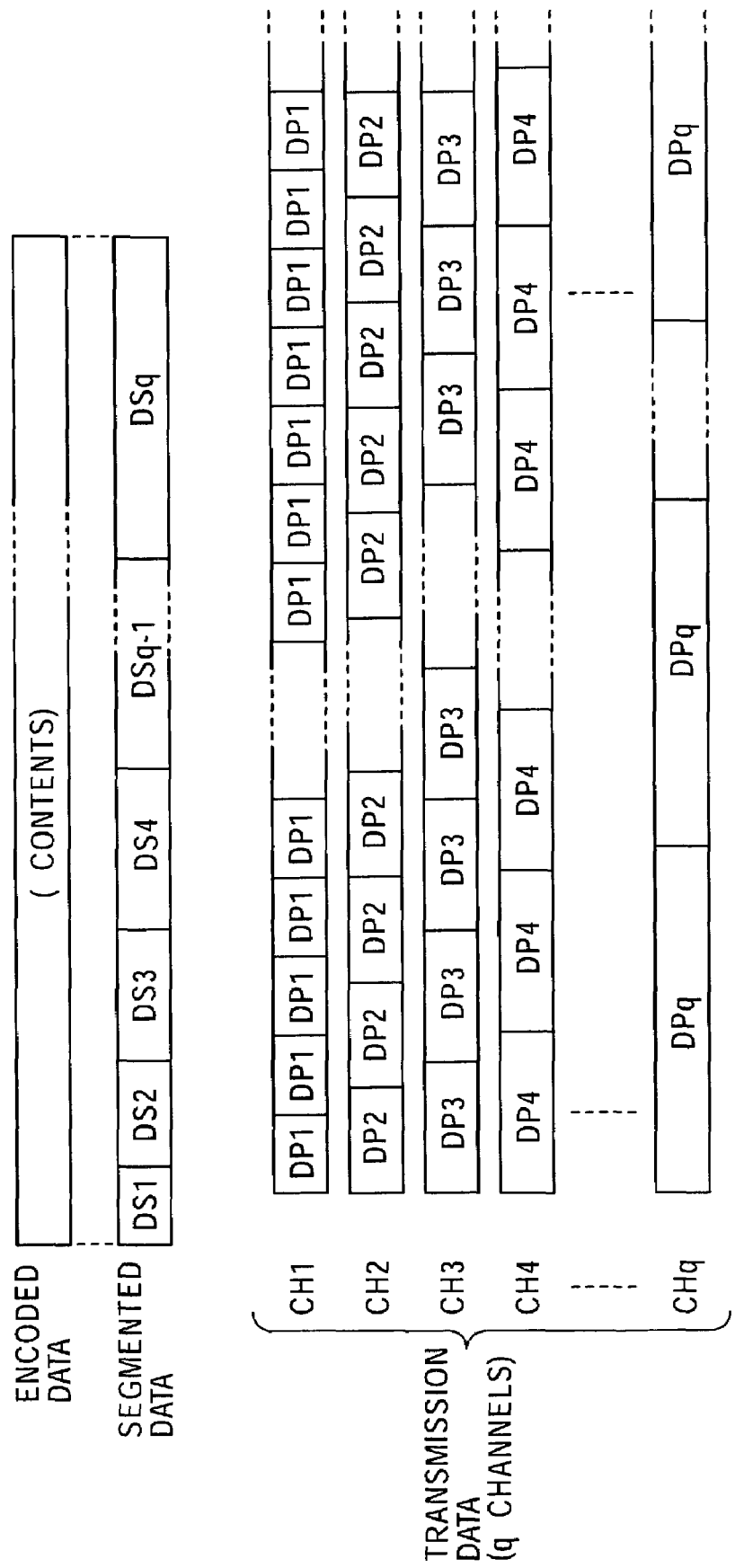
FIG. 14 is a timing chart illustrating data transmission of an on-demand form in which an unequal-length division technique and a repeated transmission technique are used.
Figure 15:
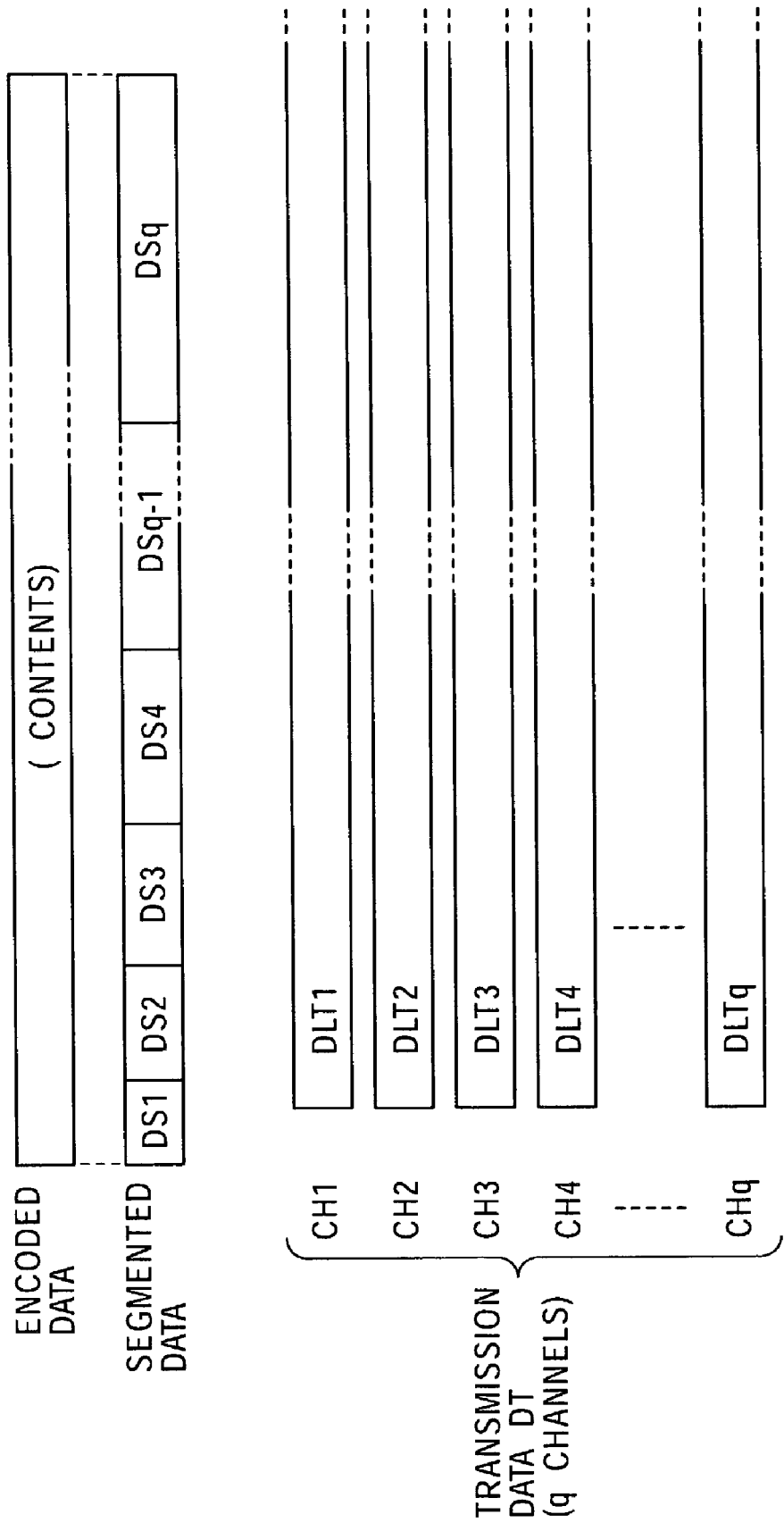
FIG. 15 is a timing chart illustrating data transmission of an on-demand form in which an unequal-length division technique and a continuous transmission technique are used.

FIG. 11 is a flowchart showing an example of an operation program executed by the CPU 54 in the receiving server 51 in a case where the CPU 54 enters the continuous packet data DLT1 to DLTn which forms the transmission data DT of n channels into the data memory section (HDD) 56, which obtains the data segments DS1 to DSn based on a portion of a predetermined amount of data in each of the continuous packet data DLT1 to DLTn, and which reproduces the encoded data DEC. In the operation program represented by this flowchart shown in FIG. 11, after the start, in step 71, a variable N is initialized to "1".

Next, in step 72, entry of the continuous packet data DLT1 to DLTn, which forms the transmission data DT of n channels, supplied through the input I/F 53, which is transmitted through the data transmission channels CH1 to CHn, into the data memory section 56 is started.

In the subsequent step 73, it is determined whether or not a portion of a predetermined amount of data in the continuous packet data DLTN of Ns=N is entered into the data memory section 56. When the determination result shows that a portion of a predetermined amount of data in the continuous packet data DLTN is not entered into the data memory section 56, the determination in step 73 is repeated. When a portion of a predetermined amount of data in the continuous packet data DLTN is entered into the data memory section 56, in step 74, the portion of the predetermined amount of data in the continuous packet data DLTN is read from the data memory section 56. A specific decoding process is performed on the packet stream data, which forms the portion of the predetermined amount of data in the continuous packet data DLTN, on which a specific coding process is performed, in order to reproduce the data segment DS from the portion of the predetermined amount of data in the continuous packet data DLTN, and the obtained data segment DSN is sent.

Thereafter, in step 75, the variable N is increased by "1", and then the process proceeds to step 76. In step 76, it is determined whether or not the variable N has reached n+1. If the variable N has not reached n+1, the process returns to step 73, where this and subsequent steps are repeated. When the variable N has reached n+1, the program is terminated.

In the manner described above, in the receiving server 51 in the example shown in FIG. 7, the encoded data DEC reproduced by the built-in CPU 54 is sent from the receiving server 51 through the output I/F 57 and is supplied to a decoder 58. In the decoder 58, a decompression decoding process in compliance with a specific method is performed on the encoded data DEC in order to obtain a reproduction output signal SVA containing a video information signal and an audio information signal, and the signal is supplied to an audio/video monitor 59, whereby audio and video based on the reproduction output signal SVA are produced.

What is claimed is:

1. A data transmission method comprising the steps of:
   dividing information data in sequence into a plurality of data segments, each having a predetermined time length, in such a manner that said predetermined time length is increased in sequence for each of said data segments until a predetermined time length is reached, and that, after said predetermined time length is reached, the length is fixed to the predetermined time length;
   converting each of the plurality of data segments which are formed in a divided manner into segmented packet data in order to form a plurality of segmented packet data; and
   repeatedly transmitting each of the plurality of segmented packet data through individual data transmission channels, thus performing multiple-channel parallel transmission.

2. A data transmission method according to claim 1, wherein the information data is subjected to a compression coding process.

3. A data transmission method according to claim 1, wherein the information data is live information data, and repeated transmission of each of a plurality of segmented packet data through individual data transmission channels is started in sequence according to a state in which said live information data arrives.

4. A data transmission method according to claim 1, wherein each of the plurality of segmented packet data is obtained as packet stream data on which a predetermined coding process is performed.

5. A data transmission method comprising the steps of:
dividing information data in sequence into a plurality of data segments, each having a predetermined time length, in such a manner that said predetermined time length is increased in sequence for each of said data segments until a predetermined time length is reached, and that, after said predetermined time length is reached, the length is fixed to the predetermined time length;
obtaining continuous packet data by performing a specific coding process on each of the plurality of data segments which are formed in a divided manner in order to form a plurality of continuous packet data; and
repeatedly transmitting each of the plurality of continuous packet data through individual data transmission channels, thus performing multiple-channel parallel transmission.

6. A data transmission method according to claim 5, wherein the information data is subjected to a compression coding process.

7. A data transmission method according to claim 5, wherein the information data is live information data, and transmission of each of a plurality of continuous packet data through individual data transmission channels is started in sequence according to a state in which said live information data arrives.

8. A data transmission apparatus comprising:
information data entering means for entering information data to memory means;
data dividing means for dividing the information data entered into said memory means in sequence into a plurality of data segments, each having a predetermined time length, in such a manner that said predetermined time length is increased in sequence for each of said data segments until a predetermined time length is reached, and that, after said predetermined time length is reached, the length is fixed to the predetermined time length;
packet data forming means for converting each of the plurality of data segments which are formed in a divided manner by the data dividing means into segmented packet data in order to obtain a plurality of segmented packet data; and
data transmission means for repeatedly transmitting each of the plurality of segmented packet data obtained by the packet data forming means through individual data transmission channels, thus performing multiple-channel parallel transmission.

9. A data transmission apparatus according to claim 8, further comprising data encoding means for supplying the information data on which a compression coding process is performed to the information data entering means.

10. A data transmission apparatus according to claim 8, wherein the data transmission means starts in sequence repeated transmission of each of the plurality of segmented packet data through individual data transmission channels according to a state in which the information data arrives at the information data entering means.

11. A data transmission apparatus according to claim 8, wherein the packet data forming means obtains each of the plurality of segmented packet data as packet stream data on which a predetermined coding process is performed.

12. A data transmission apparatus comprising:
information data entering means for entering information data to memory means;
data dividing means for dividing the information data entered into said memory means in sequence into a plurality of data segments, each having a predetermined time length, in such a manner that said predetermined time length is increased in sequence for each of said data segments until a predetermined time length is reached, and that, after said predetermined time length is reached, the length is fixed to the predetermined time length;
packet data forming means for obtaining continuous packet data by performing a specific coding process on each of the plurality of data segments which are formed in a divided manner by the data dividing means in order to form a plurality of continuous packet data; and
data transmission means for transmitting each of the plurality of continuous packet data obtained from the packet data forming means through individual data transmission channels, thus performing multiple-channel parallel transmission.

13. A data transmission apparatus according to claim 12, further comprising data encoding means for supplying the information data on which a compression coding process is performed thereon to the data entering means.

14. A data transmission apparatus according to claim 12, wherein the data transmission means starts in sequence transmission of each of the plurality of continuous packet data through individual data transmission channels according to a state in which the information data arrives at the information data entering means.

15. A data receiving method comprising the steps of:
receiving a plurality of segmented packet data, which is obtained in such a manner that each of a plurality of data segments having time lengths which are increased in sequence until a predetermined time length is reached and which are fixed to the predetermined time length after the predetermined time length is reached is converted, each of the plurality of segmented packet data being repeatedly transmitted through individual data transmission channels;
obtaining a plurality of data segments, each of which has a predetermined time length, on the basis of each of the plurality of the received segmented packet data; and
sending the plurality of data segments in sequence in order to reproduce the information data.

16. A data receiving method according to claim 15, wherein the information data on which a compression coding process is performed is reproduced is performed on the information data, and a decompression decoding process is performed on the information data.

17. A data receiving method according to claim 15, wherein a process for obtaining a data segment having a predetermined time length on the basis of each of a plurality of the received segmented packet data is started according to a state in which said plurality of segmented packet data arrives.

18. A data receiving method according to claim 15, wherein, by performing a predetermined decoding process on each of the plurality of the received segmented packet data, a data segment having a predetermined time length is obtained.

19. A data receiving method comprising the steps of:
receiving a plurality of continuous packet data, which is obtained in such a manner that a specific decoding process is performed on each of a plurality of data segments having time lengths which are increased in sequence until a predetermined time length is reached and which are fixed to the predetermined time length after said predetermined time length is reached, each of the continuous packet data being repeatedly transmitted through individual data transmission channels;

obtaining a plurality of data segments, each of which has a predetermined time length, by reproducing a data segment on the basis of a portion of a predetermined amount of data in each of the received continuous packet data; and sending the plurality of data segments in sequence in order to reproduce the information data.

20. A data receiving method according to claim 19, wherein the information data on which a compression coding process is performed is reproduced.

21. A data receiving method according to claim 19, wherein a process for reproducing a data segment on the basis of each of the plurality of the received continuous packet data is started according to a state in which said plurality of continuous packet data arrives.

22. A data receiving method according to claim 19, wherein a data segment is reproduced by performing a predetermined decoding process on each of the plurality of the received continuous packet data.

23. A data receiving apparatus comprising:

packet data entering means for receiving a plurality of segmented packet data, which is obtained in such a manner that each of a plurality of data segments having time lengths which are increased in sequence until a predetermined time length is reached and which are fixed to the predetermined time length after said predetermined time length is reached is converted, each of the plurality of segmented packet data being repeatedly transmitted through individual data transmission channels, and for entering the segmented packet data to memory means;

data segment forming means for obtaining a plurality of data segments, each of which has said predetermined time length, on the basis of the plurality of segmented packet data entered into said memory means; and data reproduction means for sending the plurality of data segments obtained by the data segment forming means in sequence in order to reproduce the information data.

24. A data receiving apparatus according to claim 23, wherein said data reproduction means reproduces the information data on which a compression coding process is performed, and performs a decompression decoding process on the information data.

25. A data receiving apparatus according to claim 23, wherein said data segment forming means starts a process for obtaining a data segment having a predetermined time length on the basis of each of the plurality of received segmented packet data according to a state in which said plurality of segmented packet data arrives at the packet data entering means.

26. A data receiving apparatus according to claim 23, wherein said data segment forming means obtains a data segment having a predetermined time length by performing a predetermined decoding process on each of the plurality of the received segmented packet data.

27. A data receiving apparatus comprising:

packet data entering means for receiving a plurality of continuous packet data, which is obtained in such a manner that a specific decoding process is performed on each of a plurality of data segments having time lengths which are increased in sequence until a predetermined time length is reached and which are fixed to the predetermined time length after said predetermined time length is reached, each of the plurality of continuous packet data being repeatedly transmitted through individual data transmission channels, and for entering the continuous packet data to memory means;

data segment forming means for obtaining a plurality of data segments each having said predetermined time length on the basis of a portion of a predetermined amount of data in each a plurality of continuous packet data entered into said memory means; and data reproduction means for sending the plurality of data segments obtained by the data segment forming means in sequence in order to reproduce the information data.

28. A data receiving apparatus according to claim 27, wherein said data reproduction means reproduces the information data on which a compression coding process is performed, and performs a decompression decoding process on the information data.

29. A data receiving apparatus according to claim 27, wherein said data segment forming means starts a process for reproducing a data segment on the basis of a portion of a predetermined amount of data in each of the plurality of the received continuous packet data according to a state in which said plurality of continuous packet data arrives at the packet data entering means.

30. A data receiving apparatus according to claim 27, wherein said data segment forming means performs a specific decoding process on a portion of a predetermined amount of data in each of the plurality of the received segmented packet data in order to reproduce a data segment.

* * * * *